(12) United States Patent
Yamada et al.

(10) Patent No.: US 9,889,736 B2
(45) Date of Patent: Feb. 13, 2018

(54) EXHAUST STRUCTURE FOR COMPACT VEHICLE

(71) Applicant: HONDA MOTOR CO., LTD., Tokyo (JP)

(72) Inventors: Hajime Yamada, Wako (JP); Yasuhiro Takada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 14/324,350

(22) Filed: Jul. 7, 2014

(65) Prior Publication Data

US 2015/0014083 A1   Jan. 15, 2015

(30) Foreign Application Priority Data

Jul. 10, 2013   (JP) .................................. 2013-144460

(51) Int. Cl.
| | |
|---|---|
| *B60K 13/04* | (2006.01) |
| *F01N 13/00* | (2010.01) |
| *F01N 3/10* | (2006.01) |
| *F01N 13/08* | (2010.01) |

(Continued)

(52) U.S. Cl.
CPC ............... *B60K 13/04* (2013.01); *B62K 5/01* (2013.01); *F01N 1/00* (2013.01); *F01N 3/10* (2013.01); *F01N 13/008* (2013.01); *F01N 13/08* (2013.01); *B60Y 2200/124* (2013.01); *F01N 2260/20* (2013.01); *F01N 2330/04* (2013.01)

(58) Field of Classification Search
CPC ..... B60K 13/00; B60K 13/04; F01N 2340/02; F01N 2340/04; F01N 13/082; F01N 13/1805; F01N 13/1822
See application file for complete search history.

(56) References Cited

U.S. PATENT DOCUMENTS 4,104,881 A * 8/1978 Kogure ................... F02D 37/02
123/327
4,349,078 A * 9/1982 Shimada ............. F01N 13/1822
180/69.1

(Continued)

FOREIGN PATENT DOCUMENTS

| JP | 2004-100598 | 4/2004 |
|---|---|---|
| JP | 2005-178419 | 7/2005 |

(Continued)

OTHER PUBLICATIONS

Machine translation of JP2007-038714 Description provided by EPO website dated Jan. 18, 2016.*

*Primary Examiner* — James A Shriver, II
*Assistant Examiner* — Vaughn Coolman
(74) *Attorney, Agent, or Firm* — Rankin, Hill & Clark LLP

(57) ABSTRACT

An exhaust pipe extends rearward of a vehicle body from an engine located forward of the rear wheels and is supported on the vehicle body frame. An exhaust muffler is coupled to a rear end of the exhaust pipe that is arranged between a pair of right and left rear wheels. A catalytic converter (catalytic device) is installed in the middle of the exhaust pipe and the exhaust pipe is deviated to one side in a horizontal direction of the vehicle body with respect to the engine and the exhaust muffler in order to position the catalytic convertor between the vehicle body frame and the rear wheels.

20 Claims, 13 Drawing Sheets

(51) Int. Cl.
*F01N 1/00* (2006.01)
*B62K 5/01* (2013.01)

(56) References Cited

U.S. PATENT DOCUMENTS

| | | | | |
|---|---|---|---|---|
| 4,817,985 A * | 4/1989 | Enokimoto | B62D 21/183 | 280/124.143 |
| 5,054,842 A * | 10/1991 | Ishiwatari | B62D 21/183 | 180/90.6 |
| 5,474,123 A * | 12/1995 | Buckshaw | F28F 19/002 | 138/110 |
| 6,430,811 B1 * | 8/2002 | Ohashi | F01N 3/2857 | 29/890 |
| 6,438,949 B1 * | 8/2002 | Nozaki | B60K 13/04 | 123/184.21 |
| 6,591,935 B1 * | 7/2003 | Petley | F01N 13/02 | 180/309 |
| 6,640,927 B1 * | 11/2003 | Turner | B60K 13/04 | 180/89.2 |
| 6,920,949 B2 * | 7/2005 | Matsuura | B60T 1/062 | 180/68.2 |
| 7,434,822 B2 * | 10/2008 | Takahashi | B62K 5/01 | 180/311 |
| 7,475,748 B2 * | 1/2009 | Nakamura | B62K 5/01 | 180/68.1 |
| 7,506,712 B2 * | 3/2009 | Kato | B60K 13/02 | 180/68.1 |
| 7,650,959 B2 * | 1/2010 | Kato | B60G 7/02 | 180/208 |
| 7,669,687 B2 * | 3/2010 | Takahashi | B62K 5/01 | 180/296 |
| 7,946,380 B2 * | 5/2011 | Yamamoto | F01N 13/14 | 181/204 |
| 8,074,756 B2 * | 12/2011 | Kusaka | B62K 5/01 | 180/225 |
| 8,336,656 B2 * | 12/2012 | Shiratori | B60K 13/02 | 180/68.1 |
| 8,893,471 B2 * | 11/2014 | Takagi | F01N 11/00 | 181/227 |
| 9,057,315 B2 * | 6/2015 | Frijas | F01N 13/008 | |
| 9,102,205 B2 * | 8/2015 | Kvien | B60G 3/20 | |
| 2004/0109796 A1 * | 6/2004 | Irving | B01D 53/9454 | 422/179 |
| 2004/0195034 A1 * | 10/2004 | Kato | B60K 17/34 | 180/312 |
| 2004/0216942 A1 * | 11/2004 | Tanaka | B60K 5/04 | 180/292 |
| 2006/0042871 A1 * | 3/2006 | Yasuda | F01N 1/24 | 181/227 |
| 2009/0113879 A1 * | 5/2009 | Ohno | B01D 39/2041 | 60/297 |
| 2009/0183937 A1 * | 7/2009 | Yamamura | B60K 13/04 | 180/89.2 |
| 2010/0000290 A1 * | 1/2010 | Goya | G01N 27/4077 | 73/23.31 |
| 2011/0225953 A1 * | 9/2011 | Ono | F01N 1/02 | 60/276 |
| 2012/0055729 A1 * | 3/2012 | Bessho | B60K 5/04 | 180/309 |
| 2012/0180303 A1 * | 7/2012 | Dappers | F01N 13/1805 | 29/525.02 |
| 2013/0182743 A1 * | 7/2013 | Nishi | G01K 1/14 | 374/144 |
| 2014/0237994 A1 * | 8/2014 | Takagi | F01N 11/00 | 60/276 |
| 2014/0288763 A1 * | 9/2014 | Bennett | B62D 11/18 | 701/31.6 |
| 2015/0259011 A1 * | 9/2015 | Deckard | B62D 21/183 | 280/781 |

FOREIGN PATENT DOCUMENTS

| | | |
|---|---|---|
| JP | 2006-027425 | 2/2006 |
| JP | 2006-103375 | 4/2006 |
| JP | 2007-038714 | 2/2007 |
| JP | 2009-108824 | 5/2009 |

* cited by examiner

FIG. 10A
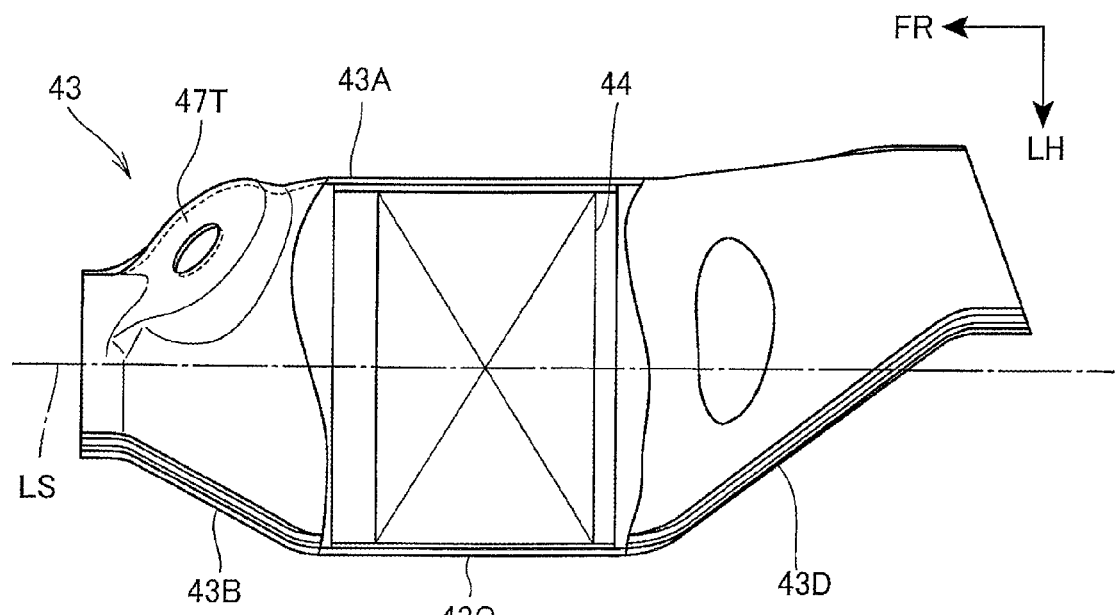
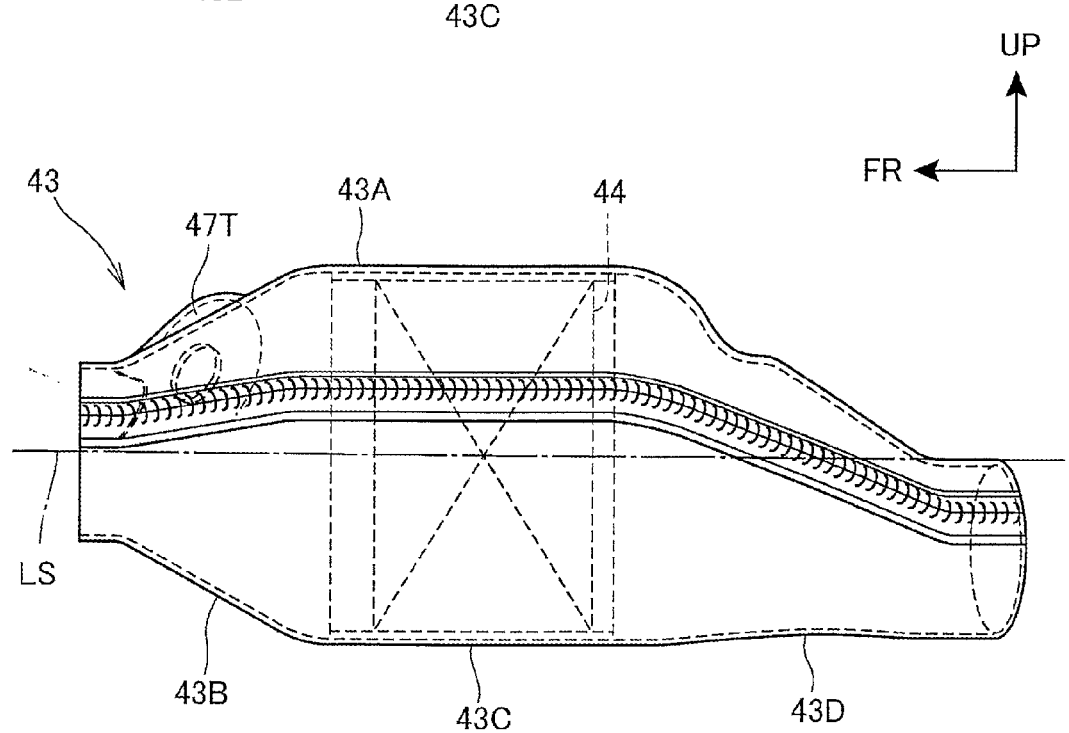
FIG. 10B

EXHAUST STRUCTURE FOR COMPACT VEHICLE

BACKGROUND OF THE INVENTION

Field of the Invention

The present invention relates to an exhaust structure for a compact vehicle including a catalytic device in the middle of an exhaust pipe.

Description of Related Art

An ATV (All Terrain Vehicle) classified into a compact vehicle includes a vehicle body frame that supports a front wheel and a pair of right and left rear wheels, and an engine that is located forward of the rear wheels and that is supported on the vehicle body frame. As for this kind of the compact vehicle, there is a structure that an exhaust pipe extends forward from a cylinder portion of the engine, is subsequently folded back rearward, and extends toward a rear side while passing through a left side of the cylinder portion, and a muffler is connected to a rear end portion of the exhaust pipe (see, for example, JP-A No. 2006-103375).

Recently, in the light of environment conservation, the mounting rate of a catalytic device for performing exhaust emission control has been increased. However, in the case where the catalytic device is added to the above-mentioned compact vehicle, if the catalytic device is installed in the middle of an exhaust pipe of the vehicle, it is necessary to apply measures for protection of a periphery from heat generated from the catalytic device. Also, since the compact vehicle does not have much empty space, securement of an arrangement space for the catalytic device is difficult.

BRIEF SUMMARY OF THE INVENTION

The present invention has been achieved in view of the above-mentioned circumstances, and an object of the present invention is to provide an exhaust structure for a compact vehicle, that can achieve efficient arrangement of a catalytic device and suppression of a thermal effect caused by radiation heat of the catalytic device.

In order to address the above-mentioned problem, in accordance with the prevent invention, there is provided an exhaust structure for a compact vehicle, the compact vehicle including a vehicle body frame that extends in a longitudinal direction to support a pair of right and left front wheels and a pair of right and left rear wheels, and an engine that is located forward of the rear wheels and that is supported on the vehicle body frame. The exhaust structure for the compact vehicle is provided with: an exhaust pipe that extends rearward of a vehicle body from the engine; and an exhaust muffler that is coupled to a rear end of the exhaust pipe, that is arranged between the pair of right and left rear wheels, and that extends in a horizontal direction of the vehicle body, and a catalytic device is installed in the middle of the exhaust pipe. The exhaust pipe is deviated to one side in the horizontal direction of the vehicle body with respect to the engine and the exhaust muffler in order to position the catalytic device between the vehicle body frame and the rear wheels.

With this construction, the catalytic device can be efficiently arranged by using a comparatively wide empty space between the vehicle body frame and the rear wheels, and also the thermal effect caused by the radiation heat of the catalytic device can be suppressed.

In the above-mentioned construction, a rear cushion may be arranged between the rear wheels and the vehicle body frame, and the catalytic device may be arranged to pass through a space that is formed by the rear cushion and the rear wheels and that has a V-shape when viewed from a back surface of the vehicle body.

With this construction, the catalytic device can be arranged by using the V-shaped space between the rear cushion and the rear wheels, and a wide heat-insulated space between the catalytic device and peripheral components can be ensured.

Also, in the above-mentioned construction, the vehicle body frame may include a pair of right and left upper frames that extend in the longitudinal direction with respect to an upper portion of the vehicle body, and the exhaust muffler may be attached to rear end portions in order to stride from side to side between the rear end portions a of the upper frames.

With this construction, the exhaust muffler can be held in a comparatively high position and in a position close to the catalytic device. With this arrangement, connection between the exhaust muffler and the catalytic device between the vehicle body frame and the rear wheels can be smoothly performed, and the heat-insulated space and improvement of engine performance by improvement of exhaust efficiency can be achieved.

Also, in the above-mentioned construction, an exhaust gas sensor may be arranged in a position facing an exhaust inlet of the catalytic device. The exhaust gas sensor may be arranged on an inner side of the exhaust pipe in a planar view of the vehicle body, and a sensor cord from the exhaust gas sensor may be arranged along the vehicle body frame.

With this construction, the exhaust gas sensor and the sensor cord can be easily protected from mud water or the like splashed by the rear wheels, and assemblability of the sensor cord can be improved.

Also, in the above-mentioned construction, an exhaust outlet of the catalytic device may be offset to an inner side in the planar view of the vehicle body with respect to an axis center of the catalytic device.

With this construction, an exhaust flow on an offset side can be ensured, detection performance of the exhaust gas sensor can be improved, and exhaust emission control performance can be improved.

Also, in the above-mentioned construction, an exhaust protector having a U-shaped cross section may be provided to cover the catalytic device and the exhaust pipe in front of and behind the catalytic device from above the vehicle body.

With this construction, the radiation heat from the catalytic device to an upper portion of the vehicle body can be reduced to prevent the thermal effect on a vehicle body cover or the like, and since the structure is such that a lower side of the exhaust protector is opened, an internal space of the exhaust protector can be cooled by traveling wind to enable a further reduction in the thermal effect.

Also, in the above-mentioned construction, the catalytic device may have an outer cylinder having a cylindrical portion that has the same cross-sectional surface and the same diameter and that extends in an axis center direction, and a catalyst that is held in order to bring the entire outer peripheral surface into contact with an inner peripheral surface of the cylindrical portion having the same diameter.

With this construction, in the construction that ensures the heat-insulated space around the catalytic device to allow the thermal effect on the outside, temperature of the outer cylinder is increased to reduce a temperature difference between the outer cylinder and the catalyst, thereby reducing a difference in heat contraction. Herewith, the catalyst can be stably held in the outer cylinder, and a reduction in service life of the catalyst caused by vibration or the like can be prevented.

In the present invention, the exhaust pipe is deviated to one side in the horizontal direction of the vehicle body with respect to the engine and the exhaust muffler in order to position the catalytic device installed in the middle of the exhaust pipe between the vehicle body frame and the rear wheels. Herewith, the catalytic device can be efficiently arranged by using the comparatively wide empty space between the vehicle body frame and the rear wheels, and also the thermal effect caused by the radiation heat of the catalyst device can be suppressed.

Also, the catalytic device is arranged to pass through the space that is formed by the rear cushion and the rear wheels and that has the V-shape when viewed from the back surface of the vehicle body. For this reason, the catalyst device can be arranged by using the V-shaped space, and the wide heat-insulated space between the catalytic device and the peripheral components can be ensured.

Also, since the exhaust muffler is attached to the rear end portions in order to stride from side to side between the rear end portions of the upper frames of the vehicle body frame, the exhaust muffler can be held in the comparatively high position and in the position close to the catalytic device. For this reason, the connection between the exhaust muffler and the catalytic device can be smoothly performed, and the heat-insulated space and the improvement of the engine performance by the improvement of the exhaust efficiency can be achieved.

Also, the exhaust gas sensor arranged in the position facing the exhaust inlet of the catalytic device is arranged on the inner side of the exhaust pipe in the planar view of the vehicle body, and the sensor cord from the exhaust gas sensor is arranged along the vehicle body frame. For this reason, the exhaust gas sensor and the sensor cord can be easily protected from the mud water or the like splashed by the rear wheels, and the assemblability of the sensor cord can be improved.

Also, the exhaust outlet of the catalytic device is offset to the inner side in the planar view of the vehicle body with respect to the axis center of the catalytic device. For this reason, the exhaust flow on the offset side can be ensured, the detection performance of the exhaust gas sensor can be improved, and the exhaust emission control performance can be improved.

Also, the exhaust protector having the U-shaped cross section is provided to cover the catalytic device and the exhaust pipe in front of and behind the catalytic device from above the vehicle body. For this reason, the radiation heat from the catalytic device to the upper portion of the vehicle body can be reduced to prevent the thermal effect on the vehicle body cover or the like, and the internal space of the exhaust protector can be cooled by the traveling wind.

Also, the catalytic device has the outer cylinder having the cylindrical portion that has the same cross-sectional surface and the same diameter and that extends in the axis center direction, and the catalyst that is held in order to bring the entire outer peripheral surface into contact with the inner peripheral surface of the cylindrical portion having the same diameter. For this reason, in the construction that can allow the thermal effect on the outside, the temperature difference between the outer cylinder and the catalyst is reduced to enable the reduction in the difference in the heat contraction.

BRIEF DESCRIPTION OF THE DRAWINGS

FIG. 10A is a plan view with the catalytic converter viewed from above, and FIG. 10B is an elevation view with the catalytic converter viewed from a left side.

FIG. 11 is a plan view with an exhaust muffler viewed from above together with the catalytic converter or the like.

DETAILED DESCRIPTION OF THE INVENTION

Figure 1:
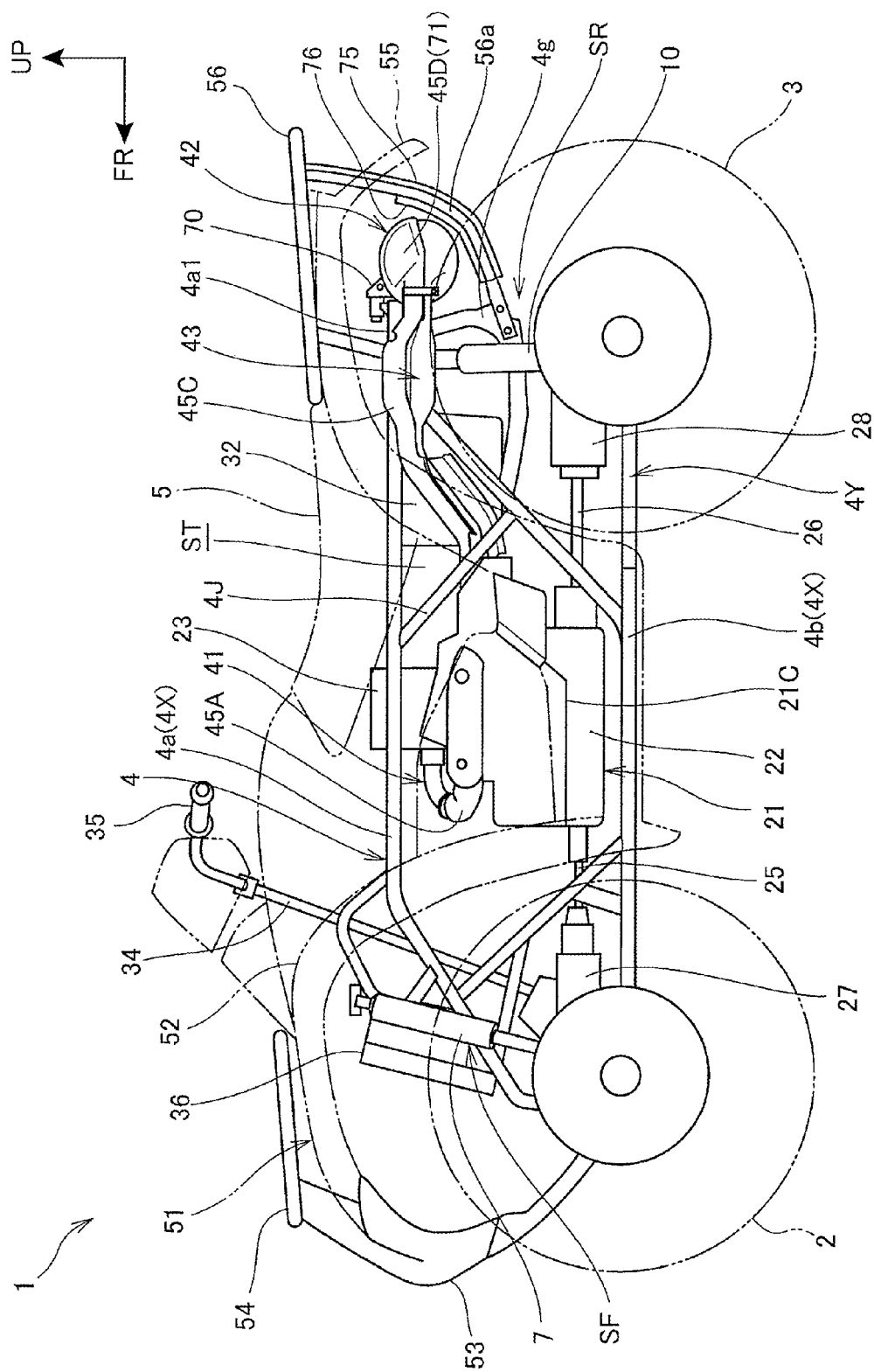
FIG. 1 is an elevation view of a saddle-ride type vehicle according to an embodiment of the present invention.

Hereinafter, one embodiment of the present invention will be described with reference to drawings. Note that in the explanation, directions such as front and rear, right and left, and upper and lower, are described with respect to a vehicle body. Also, in the drawings, an arrow FR is indicative of a front side of a vehicle, an arrow LH is indicative of a left side of the vehicle, and an arrow UP is indicative of an upper side of a vehicle body.

Figure 2:
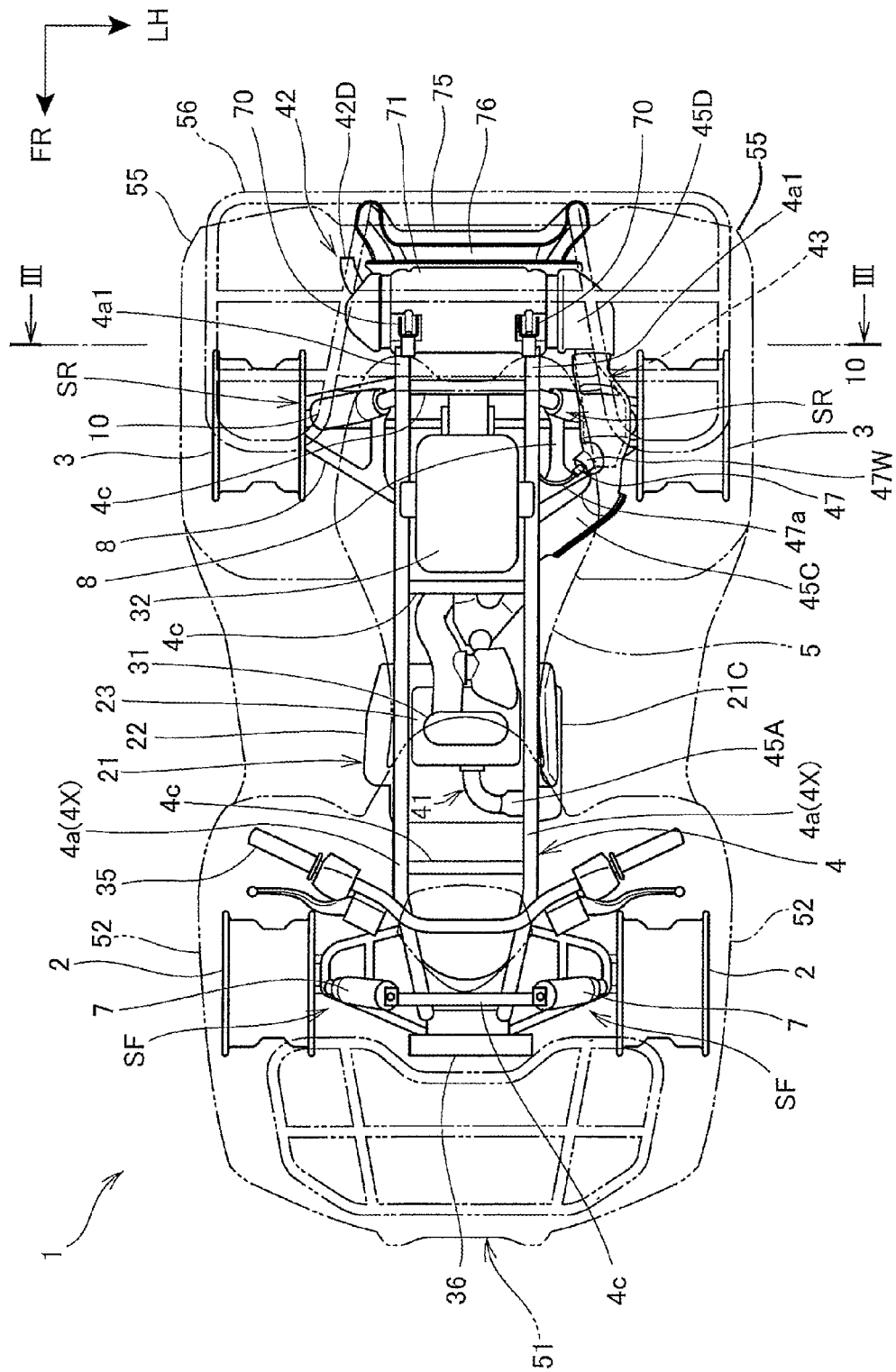
FIG. 2 is a plan view with the saddle-ride type vehicle viewed from above.

FIG. 1 is a side view of a saddle-ride type vehicle according to an embodiment of the present invention. Also, FIG. 2 is a view with the saddle-ride type vehicle viewed from above.

The saddle-ride type vehicle 1 is an all terrain vehicle called ATV configured to include a pair of right and left front wheels 2 and a pair of right and left rear wheels 3 as low-pressure balloon tires having a comparatively large diameter, that are arranged in front of and behind the compact and lightweight vehicle body, to ensure increased minimum ground clearance, and to have high ground-covering ability, especially on an irregular terrain.

The saddle-ride type vehicle 1 includes a metal vehicle body frame 4 formed in such a manner that metal materials including a plurality of metal pipes are integrally connected by welding or the like. The vehicle body frame 4 is formed as a frame extending in a longitudinal direction in order to support the front wheels 2, the rear wheels 3, and the like. Note that in FIG. 1, a reference sign 5 is an occupant seat that is located between the front wheels 2 and the rear wheels 3 and that is provided to seat an occupant thereon.

A pair of right and left independently suspending front suspensions SF is provided to a right front portion and a left front portion of the vehicle body frame 4, and the right and left front wheels 2 are suspended through the right and left front suspensions SF. The front suspensions SF are formed as a double wishbone type for suspending the front wheels 2 by a pair of upper and lower arms, and have a pair of right and left front cushions 7 that extend in a vertical direction between the vehicle body frame 4 and the front wheels 2.

A pair of right and left independently suspending rear suspensions SR is also provided to a right rear portion and a left rear portion of the vehicle body frame 4, and the right and left rear wheels 3 are suspended through the right and left rear suspensions SR. The rear suspensions SR are formed as a double wishbone type for suspending the rear wheels 3 by a pair of upper and lower arms (upper arms 8 and lower arms 9 shown in FIG. 3), and have a pair of right and left rear cushions 10 that extend in the vertical direction between the vehicle body frame 4 and the rear wheels 3.

Figure 3:
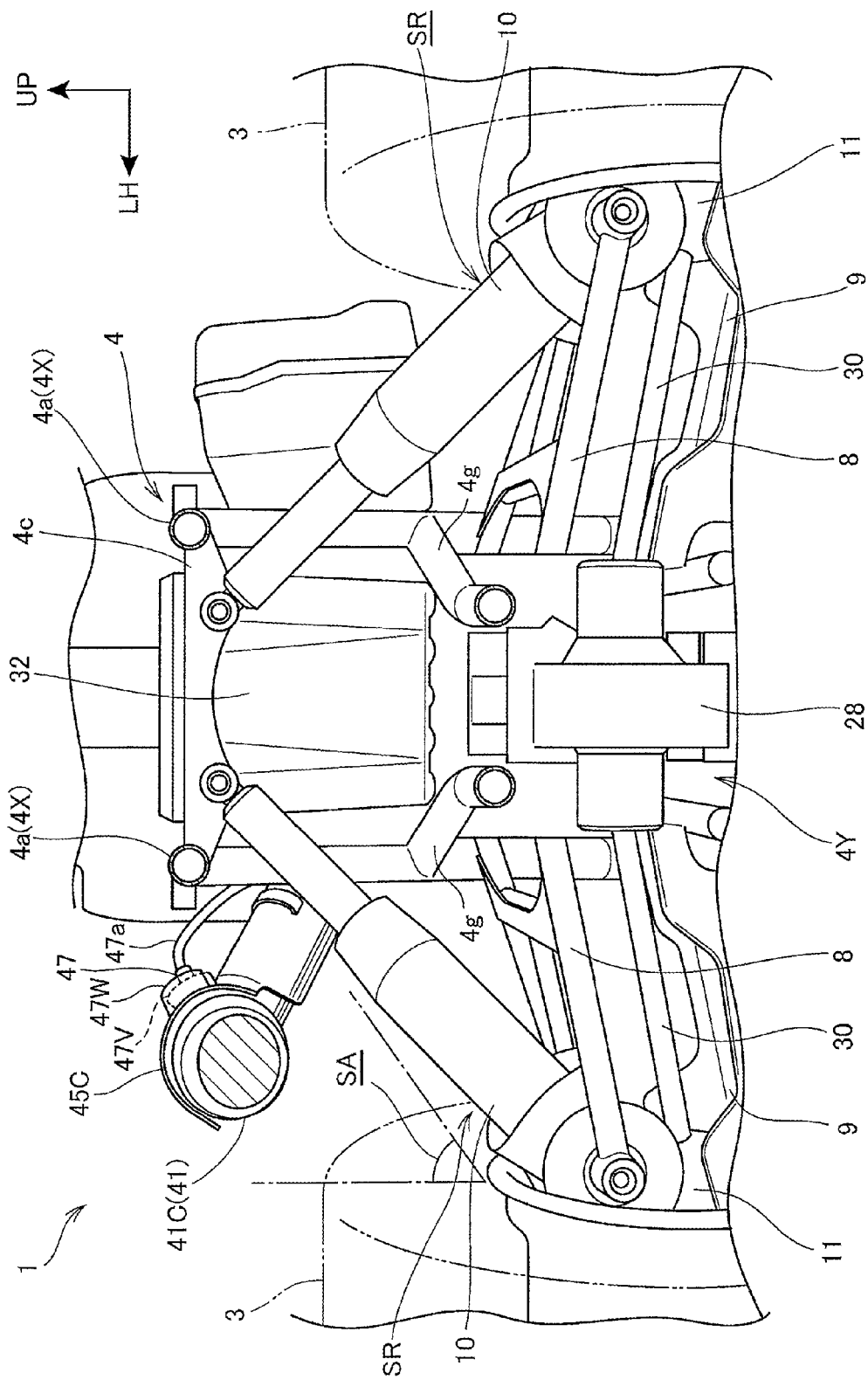
FIG. 3 is an elevation view showing a cross section taken along III-III in FIG. 2.

FIG. 3 shows a cross section taken along III-III in FIG. 2.

As shown in FIG. 3, a rear portion of the vehicle body frame 4 is provided with the pair of right and left upper arms 8 and the pair of right and left lower arms 9 as components of the right and left rear suspensions SR, at an interval in the vertical direction on the right and left sides of a final gear case 28 as will become apparent below.

Base ends of the upper arms 8 are vertically swingably supported on sub-frames 4g provided to the rear portion of the vehicle body frame 4, and base ends of the lower arms 9 are vertically swingably supported on a rear lower frame 4Y provided to a lower back portion of the vehicle body frame 4.

Knuckles 11 are coupled to tip ends of the upper arms 8 and the lower arms 9, and the rear wheels 3 are coupled to the knuckles 11. Thereby, the rear wheels 3 are vertically movably supported through the upper arms 8 and the lower arms 9.

With continued reference to FIGS. 1-3, the pair of right and left rear cushions 10 is configured such that the upper portions thereof are supported on a cross frame 4c for crosslinking a portion between rear end portions 4a1 of the right and left upper frames 4a of the vehicle body frame 4 and the lower portions thereof are supported by the knuckles 11. For this reason, since the upper portions of the pair of right and left rear cushions 10 are supported at the interval narrower than a width of the vehicle body frame 4 and the lower portions thereof are supported at substantially the same interval as the interval of the right and left rear wheels 3, the pair of right and left rear cushions 10 is arranged in an inclined posture directed outward in a vehicle width direction as approaching the lower side of the vehicle body.

By the above-mentioned construction, as shown in FIG. 3, the V-shaped space SA enlarging in the vehicle width direction as approaching the upper side when viewed from the back surface of the vehicle body (the same applies to the case as viewed from the front side of the vehicle body) is formed between the rear wheels 3 and the rear cushions 10. Although detailed description will be given in the subsequent paragraphs, in the present construction, layout of an exhaust system is performed so that the catalytic converter 43 provided in the middle of an exhaust path is arranged in the V-shaped space SA.

As shown in FIG. 1 and FIG. 2, an engine 21 as an internal combustion engine is arranged in the longitudinal center of the vehicle body frame 4. The engine 21 is a water-cooled single cylinder engine, and a cylinder portion 23 is substantially perpendicularly disposed upright on a crankcase 22 composing the lower portion of the engine. In the engine 21, the so-called vertical layout is employed so that a rotating axis of a crankshaft supported by the crankcase 22 is arranged along the longitudinal direction of the vehicle.

The crankcase 22 doubles as a transmission case for storing a transmission. As shown in FIG. 1, from the front side and the rear side of the crankcase 22, front wheel propeller shafts 25 and rear wheel propeller shafts 26 that are coupled to the transmission in the crankcase 22 are respectively led out toward the front side and the rear side.

The respective propeller shafts 25, 26 are coupled to the front and rear final gear cases 27, 28 provided on a lower side of the front portion and the lower side of the rear portion of the vehicle body frame 4. The respective final gear cases 27, 28 transmit torque of each of the propeller shafts 25, 26 to drive shafts (in FIG. 3, only the drive shaft 30 on the rear side is shown) that extend from side to side. The front wheels 2 and the rear wheels 3 are rotatively driven by rotation of the front and rear drive shafts.

Hereby, a vehicle body drive system for rotatively driving the front wheels 2 and the rear wheels 3 by driving force of the engine 21 is configured. Note that a drive system switching mechanism may be provided that is capable of switching to a two-wheel drive mode for driving either the front wheels 2 or the rear wheels 3 in addition to a four-wheel drive mode for driving all the front wheels 2 and the rear wheels 3.

The rear portion of the cylinder portion 23 of the engine 21 is connected with an air cleaner 32 through a throttle body 31. An intake system for the engine 21 is composed of the throttle body 31 and the air cleaner 32.

Also, the front portion of the cylinder portion 23 of the engine 21 is connected with a single exhaust pipe 41. The exhaust pipe 41 is connected to a single exhaust muffler 42 that extends rearward and that is arranged behind the vehicle body frame 4. An exhaust system for the engine 21 is composed of the exhaust pipe 41 and the exhaust muffler 42.

Note that in FIG. 1, an engine cover 21C is mounted on a left side of the engine 21, and a part of the exhaust pipe 41 is covered with the engine cover 21C.

A steering shaft 34 is supported in the horizontal center of the front portion of the vehicle body frame 4. A steering handlebar 35 of a bar type is integrally attached to an upper portion of the steering shaft 34, and the front wheels 2 are steered from side to side through the steering shaft 34 by manipulation of the steering handlebar 35.

A fuel tank (not shown) is supported behind the steering shaft 34 on the vehicle body frame 4 and above the engine 21, and the engine 21 is driven by fuel in the fuel tank. Also, a radiator 36 for water-cooling the engine 21 is arranged within an area in front of the steering shaft 34 on the vehicle body frame 4, thereby efficiently cooling the engine 21 by using traveling wind from the front side of the vehicle body.

A resin vehicle body cover 51 for covering the front portion of the vehicle body from above and resin front fenders 52 for covering both the front wheels 2 over the rear side from above are mounted to the front portion of the vehicle body frame 4. Further, a front protector 53 for covering the front side of the vehicle body cover 51, a front carrier 54 positioned above the vehicle body cover 51, and the like are mounted to the front portion of the vehicle body frame 4.

Also, resin rear fenders 55 for covering both the rear wheels 3 over the upper side from the front side thereof, and a rear carrier 56 mainly made of steel, are mounted to the rear portion of the vehicle body frame 4.

Figure 4:
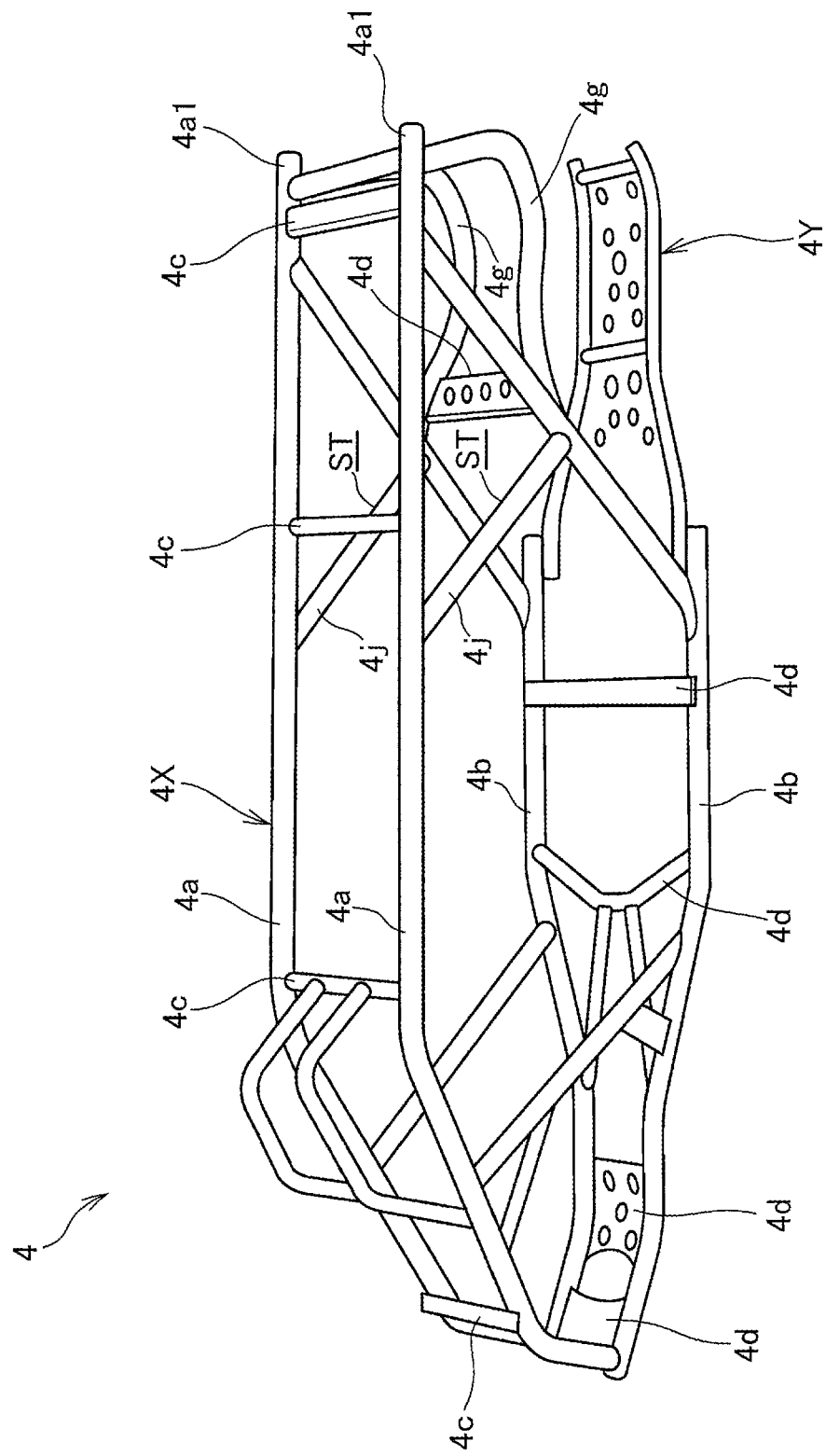
FIG. 4 is a perspective view of a vehicle body frame.

FIG. 4 shows the vehicle body frame 4. The vehicle body frame 4 includes a frame main body 4X having a pipe frame structure extending in the longitudinal direction of the vehicle body, and a rear lower frame 4Y extending rearward from a lower portion of the frame main body 4X.

The frame main body 4X has a longitudinally long box structure having a pair of right and left upper frames 4a that extend in the longitudinal direction with respect to the upper portion of the vehicle body and a pair of right and left lower frames 4b that extend in the longitudinal direction with respect to the upper portion of the vehicle body. The pair of right and left upper frames 4a is formed as a pipe frame configured to extend upward to the rear from a front end, to be subsequently bent in front of the engine 21, and to horizontally extend rearward. Also, the right and left upper frames 4a are coupled to each other through a plurality of cross frames 4c at the interval in the longitudinal direction.

The pair of right and left lower frames 4b extends downward to the rear from the front end, is subsequently bent in front of the engine in the side view, horizontally extends rearward, is bent behind the engine 21, and extends upward to the rear. Also, the right and left lower frames 4b are coupled to each other through a plurality of cross frames 4d at the interval in the longitudinal direction.

As shown in FIG. 4, the front portions of the upper frames 4a and the lower frames 4b are coupled to each other, and the rear ends of the lower frames 4b are coupled to portions forward of the rear end portions 4a1 of the upper frames 4a. Thereby, the vehicle body frame is formed to have a closed loop structure. The engine 21 is arranged in an area in the longitudinal center of the vehicle body surrounded by the frames 4a, 4b.

A pair of right and left sub-frames 4g is mounted to the rear upper portions of the frame main body 4X. The pair of right and left sub-frames 4g is formed as a curved frame configured to extend substantially horizontally rearward from the rear portions of the right and left lower frames 4b, to be subsequently curved upward, and to be coupled to the rear end portions 4a1 of the upper frames 4a. With reference to FIGS. 1, 3, and 4, the upper arms 8 of the rear suspensions SR are rotatably attached to the sub-frames 4g, and carrier stays 56a extending from the rear carrier 56 are also attached thereto.

A pair of right and left pipe frames (cross frames) 4j extending downward to the rear is crosslinked between the longitudinal intermediate portions of the upper frames 4a and the rear portions of the lower frames 4b, and the frame main body 4X is reinforced by the pipe frames 4j.

Since the right and left pipe frames 4j extend downward to the rear, a gap ST (see FIG. 4) having a triangular shape in the side view is formed between the upper frames 4a and the lower frames 4b.

The rear lower frame 4Y extends rearward from the lower back portions of the right and left lower frames 4b. The rear lower frame 4Y is mounted with the lower arms 9 of the rear suspensions SR in a rotatable manner and the final gear case 28.

Next, an exhaust structure for the saddle-ride type vehicle 1 will be described.

Figure 5:
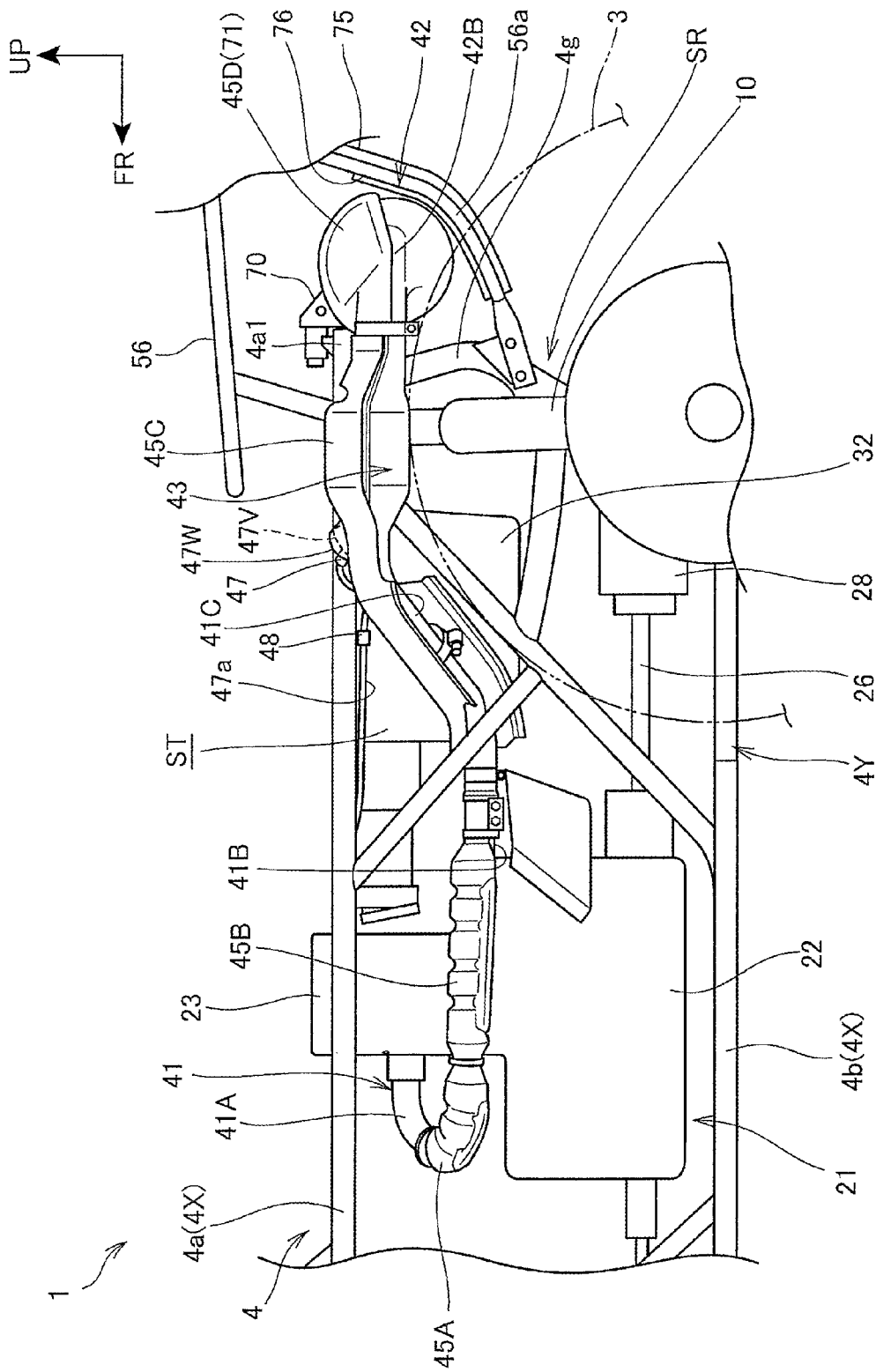
FIG. 5 is an elevation view with an exhaust structure viewed from a lateral side together with peripheral construction.
Figure 6:
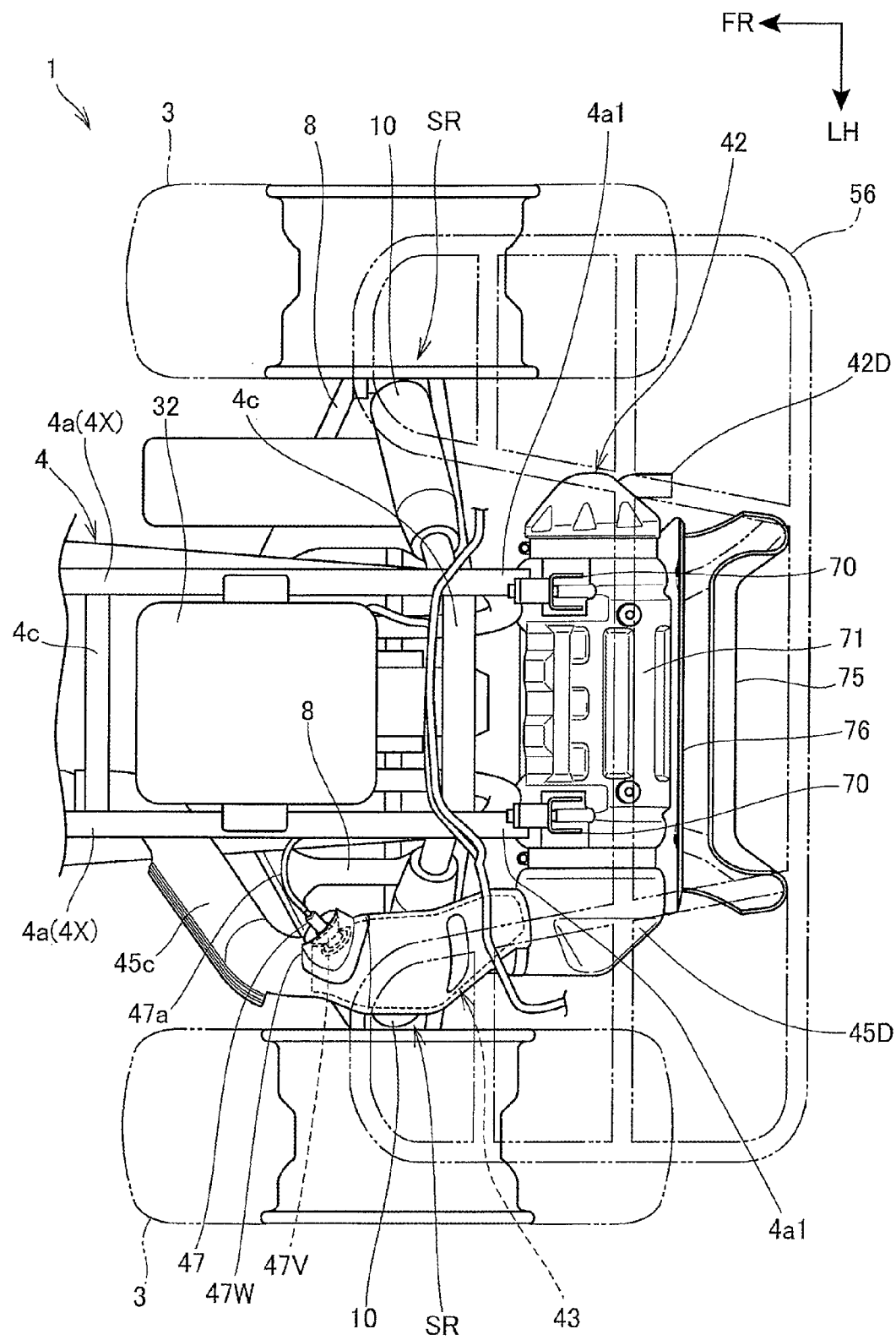
FIG. 6 is a plan view with the exhaust structure viewed from above together with the peripheral construction.

FIG. 5 is a view with the exhaust structure viewed from a lateral side together with a peripheral construction. FIG. 6 is a view with the exhaust structure viewed from above together with the peripheral construction.

With reference to FIG. 5 and FIG. 6, the exhaust system for the saddle-ride type vehicle 1 includes the exhaust pipe 41, the exhaust muffler 42, and the catalytic converter 43 installed between the exhaust pipe 41 and the exhaust muffler 42. The exhaust pipe 41 roughly includes a first exhaust pipe 41A connected to the cylinder portion 23, a second exhaust pipe 41B connected to a downstream end of the first exhaust pipe 41A, and a third exhaust pipe 41C connected to a downstream end of the second exhaust pipe 41B. Then, the catalytic converter 43 is coupled to a downstream end of the third exhaust pipe 41C.

Figure 7:
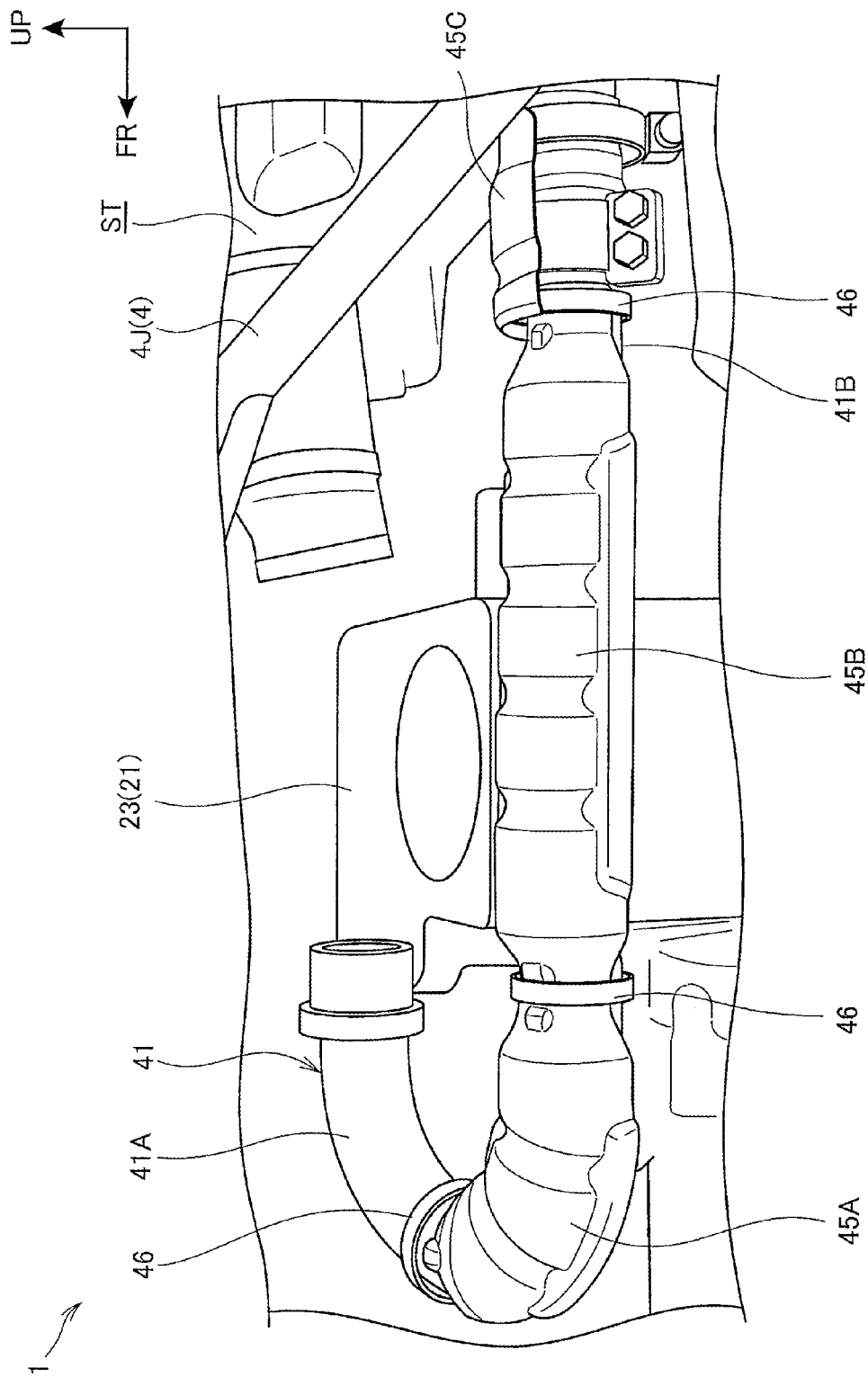
FIG. 7 is a perspective view with a first exhaust pipe and a second exhaust pipe viewed from an upper left side together with the peripheral construction.
Figure 8:
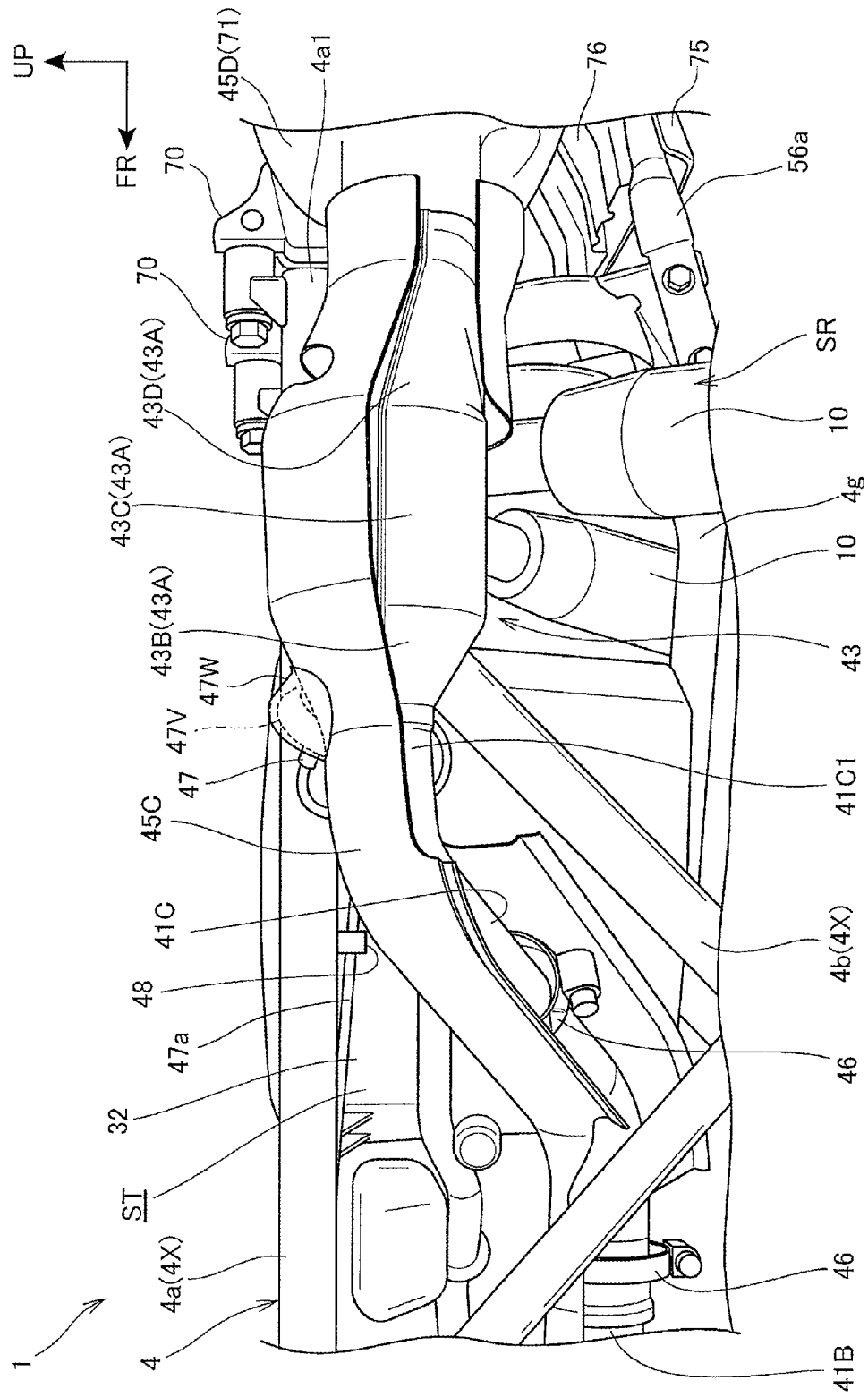
FIG. 8 is an elevation view with a third exhaust pipe and a catalytic converter viewed from the upper left side together with the peripheral construction.
Figure 9:
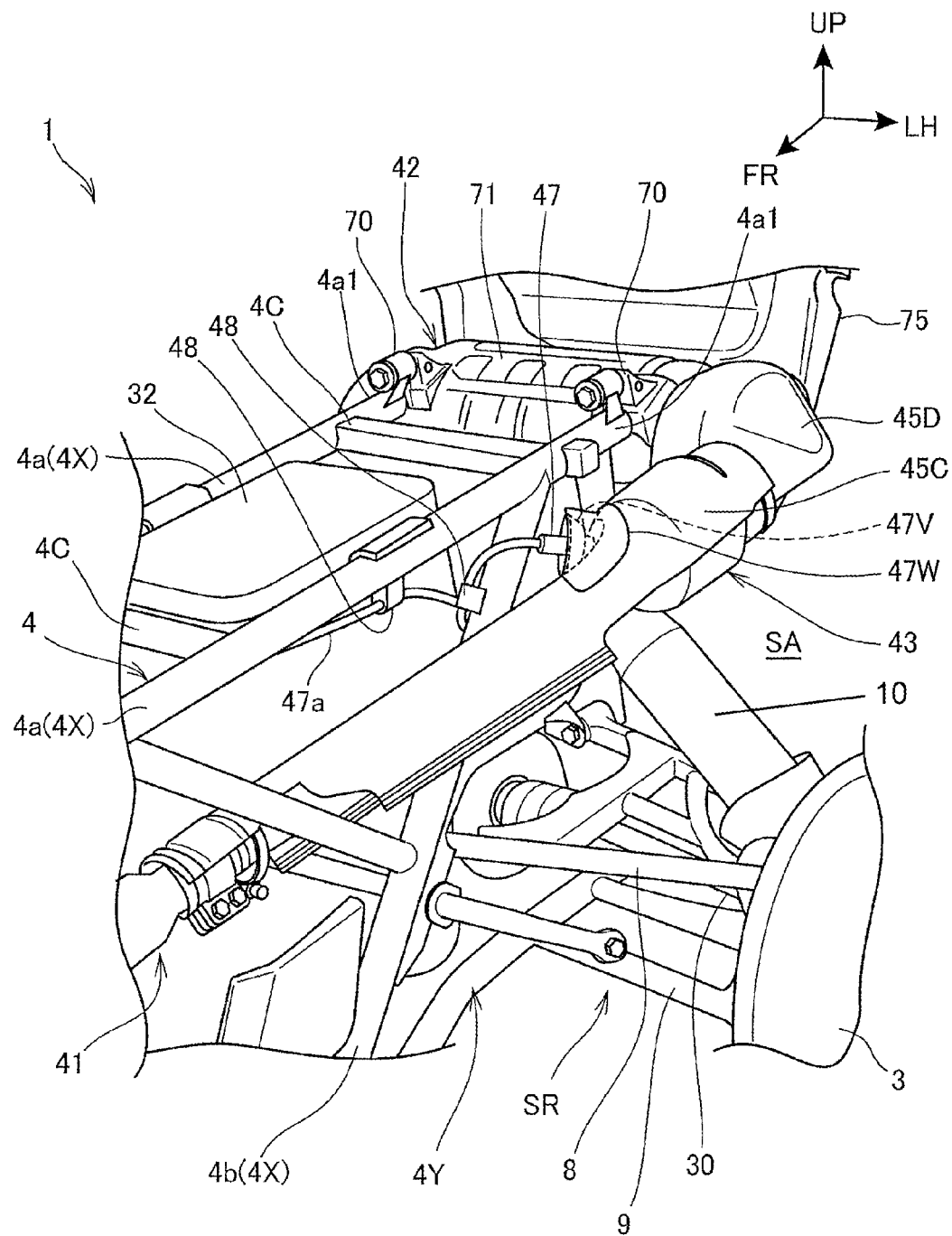
FIG. 9 is a perspective view with the catalytic converter viewed from a left front side together with the peripheral construction.

Here, FIG. 7 is a view with the first exhaust pipe 41A and the second exhaust pipe 41B viewed from an upper left side together with the peripheral construction, and FIG. 8 is a view with the third exhaust pipe 41C and the catalytic converter 43 viewed from the upper left side together with the peripheral construction. Also, FIG. 9 is a perspective view with the catalytic converter 43 viewed from a left front side together with the peripheral construction.

As shown in FIG. 7, the first exhaust pipe 41A is formed into a circular pipe shape configured to extend forward from the cylinder portion 23, to be subsequently bent to the left side, and to be directed rearward. Note that FIG. 7 shows the view with a cylinder head of the engine 21 removed.

A metal first exhaust protector 45A functioning as a heat protector is mounted to the first exhaust pipe 41A by using a metal band 46 functioning as a fixture. The first exhaust protector 45A is formed to have a U-shaped cross section that can surround the first exhaust pipe 41A, covers from above a portion extending toward the lateral side of the vehicle body (the left side of the vehicle body) beyond the cylinder portion 23 of the first exhaust pipe 41A, and covers the upper side of the first exhaust pipe 41A and the lateral side of the vehicle body.

The second exhaust pipe 41B has a linear circular pipe shape horizontally extending rearward from the rear end of the first exhaust pipe 41A, and is formed to have the same cross-sectional surface as that of the first exhaust pipe 41A. A second exhaust protector 45B formed separately from the first exhaust protector 45A is mounted to the second exhaust pipe 41B by using the metal band 46. The second exhaust protector 45B is formed into a metal cover having a U-shaped cross section capable of surrounding the second exhaust pipe 41B from above, and covers the upper portion of the second exhaust pipe 41B over the entire longitudinal direction and the lateral side of the vehicle body.

Note that the rear end of the first exhaust protector 45A and the front end of the second exhaust protector 45B are configured to overlap with each other, to be fixed by the common metal band 46, and to prevent the exhaust pipe 41 from being exposed from a portion between the rear end and the front end.

Also, the first exhaust pipe 41A and the second exhaust pipe 41B are arranged in a space surrounded by the vehicle body frame 4. More specifically, the first exhaust pipe 41A is arranged using an empty space formed forward of the cylinder portion 23 and above the crankcase 22. Also, the second exhaust pipe 41B is arranged using an empty space formed on the lateral side (left side) of the cylinder portion 23 and above the crankcase 22.

The third exhaust pipe 41C has a circular pipe shape configured to extend rearward and outward in the vehicle width direction from the rear end of the second exhaust pipe 41B toward the empty space between the vehicle body frame 4 and the rear wheels 3, and is formed into a pipe shape having the same cross-sectional surface as that of the second exhaust pipe 41B.

More specifically, as shown in FIG. 8, the third exhaust pipe 41C extends rearward from the rear end of the second exhaust pipe 41B, and subsequently extends outward in the vehicle width direction and upward to the rear. Thereby, as shown in FIG. 8, the third exhaust pipe 41C is pulled out of the vehicle body frame 4 through the gap ST having the triangular shape in the side view surrounded by the upper frames 4a, the lower frames 4b, and the pipe frames 4j.

The rear end of the third exhaust pipe 41C extends rearward in the vicinity of the upper frames 4a on the outer side in the vehicle width direction of the upper frames 4a. With reference to FIG. 8 and FIG. 9, the rear end portion 41C1 of the third exhaust pipe 41C is arranged in front of the space SA (FIG. 9) between the rear cushions 10 and the rear wheels 3. Thereby, the catalytic converter 43 coupled to the rear end portion 41C1 is arranged within the V-shaped space SA (FIG. 9) between the rear cushions 10 and the rear wheels 3.

A third exhaust protector 45C formed separately from the second exhaust protector 45B is mounted to the third exhaust pipe 41C and the catalytic converter 43 by using the metal band or the like. The third exhaust protector 45C is formed into a metal cover having a U-shaped cross section capable of surrounding from above the third exhaust pipe 41C and the catalytic converter 43, and covers the upper portions of the third exhaust pipe 41C and the catalytic converter 43 over the entire longitudinal direction.

Note that the rear end of the second exhaust protector 45B and the front end of the third exhaust protector 45C are configured to overlap with each other and to prevent the exhaust pipe 41 from being exposed from a portion between the rear end and the front end.

Figure 11:
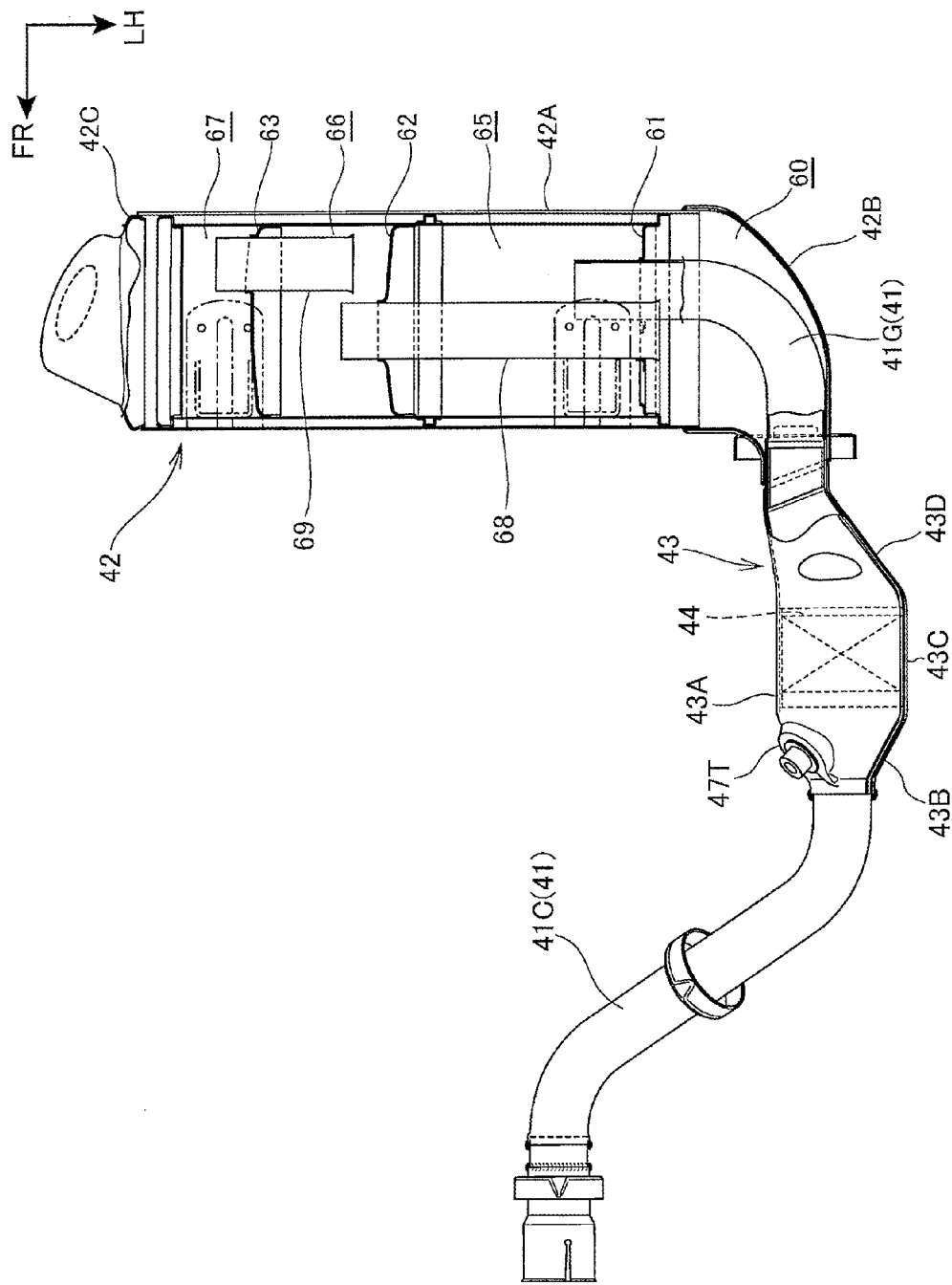

As shown in FIG. 9, exhaust pipe portions (a curved exhaust pipe 41G and a cylindrical cover 42B shown in FIG. 11) for connecting the catalytic converter 43 and the exhaust muffler 42 is covered with a fourth exhaust protector 45D formed separately from the third exhaust protector 45C. The fourth exhaust protector 45D is formed into a metal cover having a U-shaped cross section capable of surrounding from above the exhaust pipe portions. Thereby, the whole exhaust pipe 41 including the catalytic converter 43 is covered with the first exhaust protector 45A to the fourth exhaust protector 45D.

FIG. 10A is a view with the catalytic converter 43 viewed from above, and FIG. 10B is a side view with the catalytic converter 43 viewed from the left side.

The catalytic converter 43 includes an outer cylinder 43A extending in an axis center direction of the third exhaust pipe 41C, and a catalyst 44 held in the outer cylinder 43A. The outer cylinder 43A is formed into a metal cylindrical body having a vertically divided structure, and is formed by joining the outer cylinder 43A by welding or the like after the catalyst 44 is stored in the inside.

More specifically, the outer cylinder 43A has an enlarged-diameter cylindrical portion 43B with a diameter gradually enlarged from the upstream end (a connection with the third exhaust pipe 41C), and a cylindrical portion 43C having the same cross-sectional surface and the same diameter, that extends in the axis center direction from the rear end of the enlarged-diameter cylindrical portion 43B. Also, the outer cylinder 43A has a reduced-diameter cylindrical portion 43D with a diameter gradually reduced from the rear end of the cylindrical portion 43C having the same diameter.

As shown in FIG. 10A and FIG. 10B, the axis centers of the enlarged-diameter cylindrical portion 43B and the cylindrical portion 43C having the same diameter conform with the axis center LS of the catalyst 44. On the other hand, the axis center of the reduced-diameter cylindrical portion 43D is offset to the inner side in the vehicle width direction in comparison with the axis center (=the axis center LS) of each of the enlarged-diameter cylindrical portion 43B and the cylindrical portion 43C having the same diameter in the planar view of the vehicle body (FIG. 10A), and is offset lower than the axis center (=the axis center LS) in the side view of the vehicle body (FIG. 10B).

An outer diameter of the catalyst 44 is substantially the same as an inner diameter of the cylindrical portion 43C having the same diameter of the outer cylinder 43A, and a length of the catalyst 44 in the axis center direction is substantially the same length as the length of the cylindrical portion 43C having the same diameter (strictly, the length is shorter than the length of the cylindrical portion 43C having the same diameter).

As shown in the drawing, the catalyst 44 is fitted into the outer cylinder 43A by bringing the whole outer peripheral surface into contact with the inner peripheral surface of the cylindrical portion 43C having the same diameter, and is fixed to the outer cylinder 43A by joining such as the welding (in the present construction, fixed by four-spot welding). Thereby, the catalyst 44 is held with the whole outer peripheral surface brought into contact with the inner peripheral surface of the outer cylinder 43A.

With the catalyst holding structure, since a contact area of the catalyst 44 with the outer cylinder 43A (the cylinder portion 43C having the same diameter) can be maximized, thermal conduction between the catalyst 44 and the outer cylinder 43A (the cylindrical portion 43C having the same diameter) is smoothened. Thereby, a temperature difference between the catalyst 44 and the outer cylinder 43A (the cylindrical portion 43C having the same diameter) can be reduced, and a difference in heat deformation volume between the catalyst 44 and the outer cylinder 43A can be reduced.

Since the catalyst 44 has a high temperature due to reaction heat with exhaust gas, temperature of the outer cylinder 43A is raised by heat of the catalyst 44. In this case, since the outer cylinder 43A is arranged in the V-shaped empty space SA between the rear wheels 3 and the rear cushions 10, the gap between the catalyst and the peripheral components, that is, a clearance can be ensured, and the thermal effect on the peripheral components can be reduced. In other words, with an arrangement structure for the catalytic converter 43, since high-temperature toughness can be improved, the contact area of the catalyst 44 with the outer cylinder 43A is increased to reduce the temperature difference, and a difference in each heat contraction can be reduced.

As a result of experiments by the inventors, in the event that a stainless mesh sliding structure is employed as an example for a structure for supporting both the axial ends of the catalyst 44 to the outer cylinder, when the center temperature of the catalyst 44 is 894 degrees C., the temperature of the outer cylinder was 340 degrees C. In contrast, in the present construction, it is verified that when the center temperature of the catalyst 44 is 888 degrees C., the temperature of the outer cylinder 43A was 645 degrees C., and it was clear that the temperature difference between the catalyst 44 and the outer cylinder 43A can be reduced.

In addition, in the present construction, since the contact area of the catalyst 44 with the outer cylinder 43A is increased, such effects can be achieved that the catalyst 44 is less likely to be displaced also by pressure or the like of exhaust gas and supporting strength of the catalyst 44 can be easily ensured.

Further, in the present construction, the catalytic converter 43 is arranged using the wide empty space in the vehicle width direction between the rear wheels 3 and the vehicle body frame 4, the catalytic converter 43 is enlarged while ensuring the clearance with the peripheral components (see FIG. 9). Achievement of the enlargement can shorten the length of the catalytic converter 43 by the part of the enlargement, and is also advantageous to mass centralization of the saddle-ride type vehicle 1.

Also, as shown in FIG. 8 and FIG. 9, the catalytic converter 43 is arranged to longitudinally stride across the outer side of the rear cushion 10 on the left side of the vehicle body. Thereby, the catalytic converter 43 can be arranged using the empty space between the rear wheels 3 and the vehicle body frame 4 in front of and behind the rear cushions 10 in addition to the V-shaped empty space SA (see FIG. 3 and FIG. 9) between the rear wheels 3 and the rear cushions 10.

In this way, in the present construction, since the catalytic converter 43 is arranged using the empty space between the rear wheels 3 and the vehicle body frame 4, the catalytic converter 43 can be efficiently arranged without the enlargement of the saddle-ride type vehicle 1.

Also, with this arrangement, as shown in FIG. 6, the rear wheels 3 exist on the outer side in the vehicle width direction of the catalytic converter 43, the upper and lower arms 8, 9 and the like of the rear suspensions SR exist below the rear wheels 3, and the rear cushions 10, the vehicle body frame 4, and the like exist on the inner side in the vehicle width direction. Thereby, the catalytic converter 43 can be guarded from mud or the like by using the vehicle components.

Further, as shown in FIG. 6, since the catalytic converter 43 is arranged behind the intake system including the air cleaner 32, an influence of heat of the catalytic converter 43 on the intake system can be suppressed, and an intake temperature rise can be also suppressed.

Also, since the catalytic converter 43 is covered with the third exhaust protector 45C from above and the rear carrier 39 exists above the catalytic converter, heat release to a side of the rear carrier 39 can be suppressed, and also the catalytic converter 43 can be guarded using the rear carrier 39.

With reference to FIG. 6 and FIG. 8, an exhaust gas sensor 47 is mounted on the inner side in the vehicle width direction of the enlarged-diameter cylindrical portion 43B of the outer cylinder 43A (on the inner side of the exhaust pipe 41 in the planar view of the vehicle body). Note that in FIG. 10A and FIG. 10B, a reference sign 47T is indicative of a mounting portion for the exhaust gas sensor 47.

As shown in FIG. 6, the exhaust gas sensor 47 is so configured that a component 47V enlarged in a flared shape is arranged between the exhaust gas sensor 47 and the mounting portion 47T provided to the outer cylinder 43A, and heat on the side of the catalytic converter 43 is less likely to be conducted to the sensor cord 47a by the component 47V. Also, a sensor guard 47W is mounted to cover a portion of the exhaust gas sensor 47 on a side of the sensor from above. The sensor guard 47W is formed of a stainless curved plate member curved along an outer shape of the component 47V, and attached to the outer cylinder 43A by spot welding.

In this way, the exhaust gas sensor 47 is arranged. Thereby, the exhaust gas sensor 47 is disposed in the position facing the exhaust inlet of the catalytic converter 43 to enable measurement of an exhaust gas state in a catalyst inlet, and exposure of the exhaust gas sensor 47 to the outside in the vehicle width direction can be avoided. Also, since the sensor guard 47W is installed, conduction of heat in the portion on the side of the sensor, having high temperature due to exhaust gas, to the periphery, can be effectively suppressed.

As described above, the reduced-diameter cylindrical portion 43D of the outer cylinder 43A is formed to be offset to the inner side in the vehicle width direction with respect to the axis center of the catalytic converter 43 (=the axis center LS of the catalyst 44) (see FIG. 10A). Thereby, since an exhaust flow on the offset side can be ensured, the detection performance of the exhaust gas sensor 47 can be improved.

If the detection performance can be improved, engine control according to the exhaust gas state can be performed with higher accuracy. Thereby, the exhaust emission control performance can be improved. Also, by the above-mentioned offset, a connection position with the exhaust muffler 42 can be placed close to the inner side in the vehicle width direction. Therefore, as shown in FIG. 6, overhang of the exhaust muffler 42 to the outer side in the vehicle width direction can be also suppressed.

Further, since the exhaust gas sensor 47 is provided on the inner side in the vehicle width direction (the inner side of the exhaust pipe 41 in the planar view of the vehicle body), the vehicle body frame 4 is positioned in the vicinity of the exhaust gas sensor 47. In the present construction, as shown in FIG. 8 and FIG. 9, the sensor cord 47a from the exhaust gas sensor 47 is wired along the lower surface of the left upper frame 4a as the vehicle body frame 4 positioned closest to the exhaust gas sensor 47.

For this reason, the exhaust gas sensor 47 and the sensor cord 47a can be protected from the mud water or the like splashed by the rear wheels 3, and also assemblability such as positioning of the sensor cord 47a can be easily achieved. Note that a reference sign 48 in FIG. 8 and FIG. 9 is a cord supporting member for wiring the sensor cord 48a.

Subsequently, the exhaust muffler 42 will be described.

Figure 12:
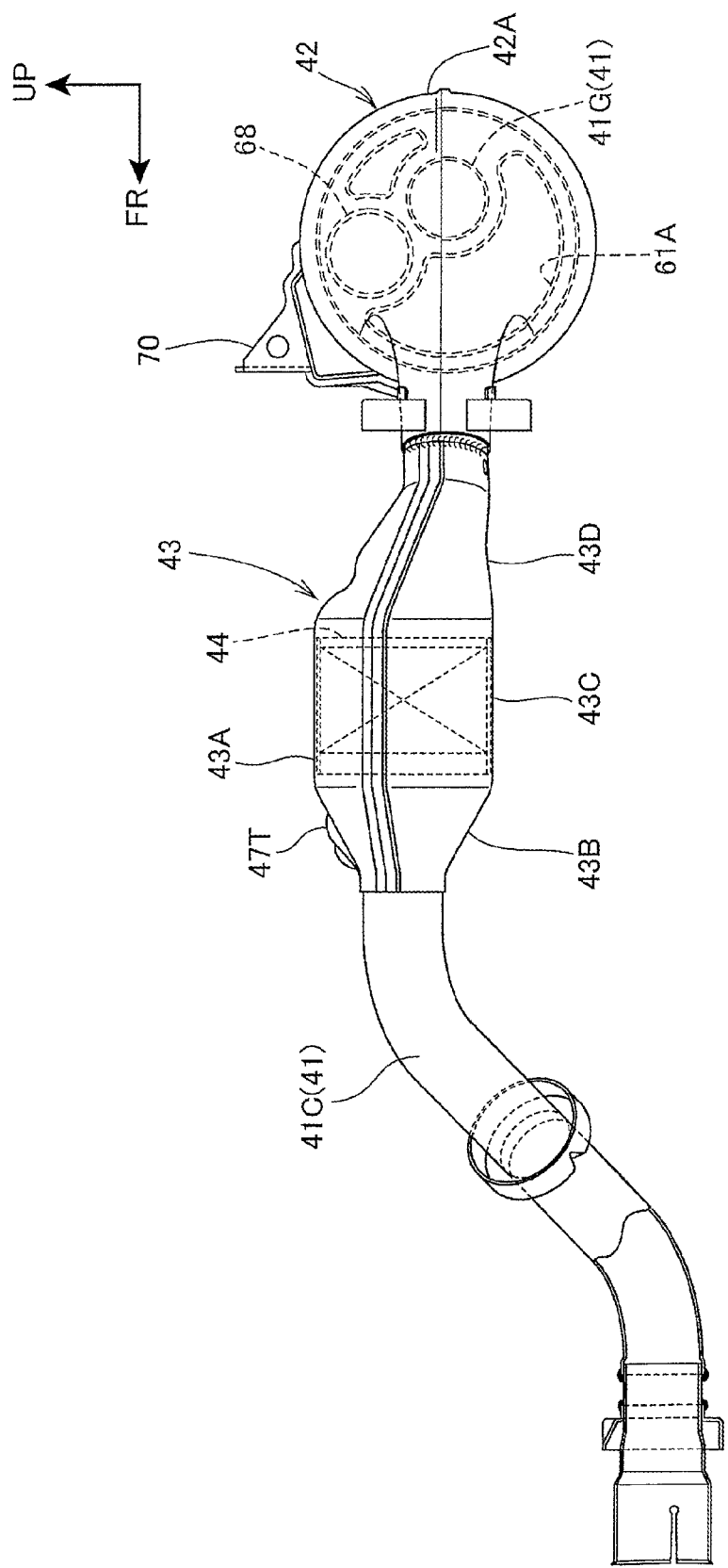
FIG. 12 is an elevation view with FIG. 11 viewed from a leftward direction.

FIG. 11 is a view with the exhaust muffler 42 viewed from above together with the catalytic converter 43 or the like, and FIG. 12 is a view with FIG. 11 viewed from the left side.

As shown in FIG. 11 and FIG. 12, the exhaust muffler 42 has a cylindrical body 42A having a cylindrical shape that has a cross-sectional surface having the same diameter and that extends linearly in the vehicle width direction.

The cylindrical body 42A is connected to a curved exhaust pipe 41G that extends rearward from the exhaust outlet of the catalytic converter 43 and that is subsequently curved to the inner side in the vehicle width direction, and is formed into the cylindrical shape that is arranged along the axis center of a rear end of the curved exhaust pipe 41G, that has the cross-sectional surface having the same diameter, and that extends linearly in the vehicle width direction.

An upstream end of the cylindrical body 42A is mounted with a metal cylindrical cover 42B for covering with a gap between the metal cylindrical cover 42B and the outer peripheral surface of the curved exhaust pipe 41G. The upstream end of the cylindrical cover 42B is joined to the rear end of the catalytic converter 43, so that a space portion 60 separated from an outer space is formed between the cylindrical cover 42B and the curved exhaust pipe 41G.

Figure 13:
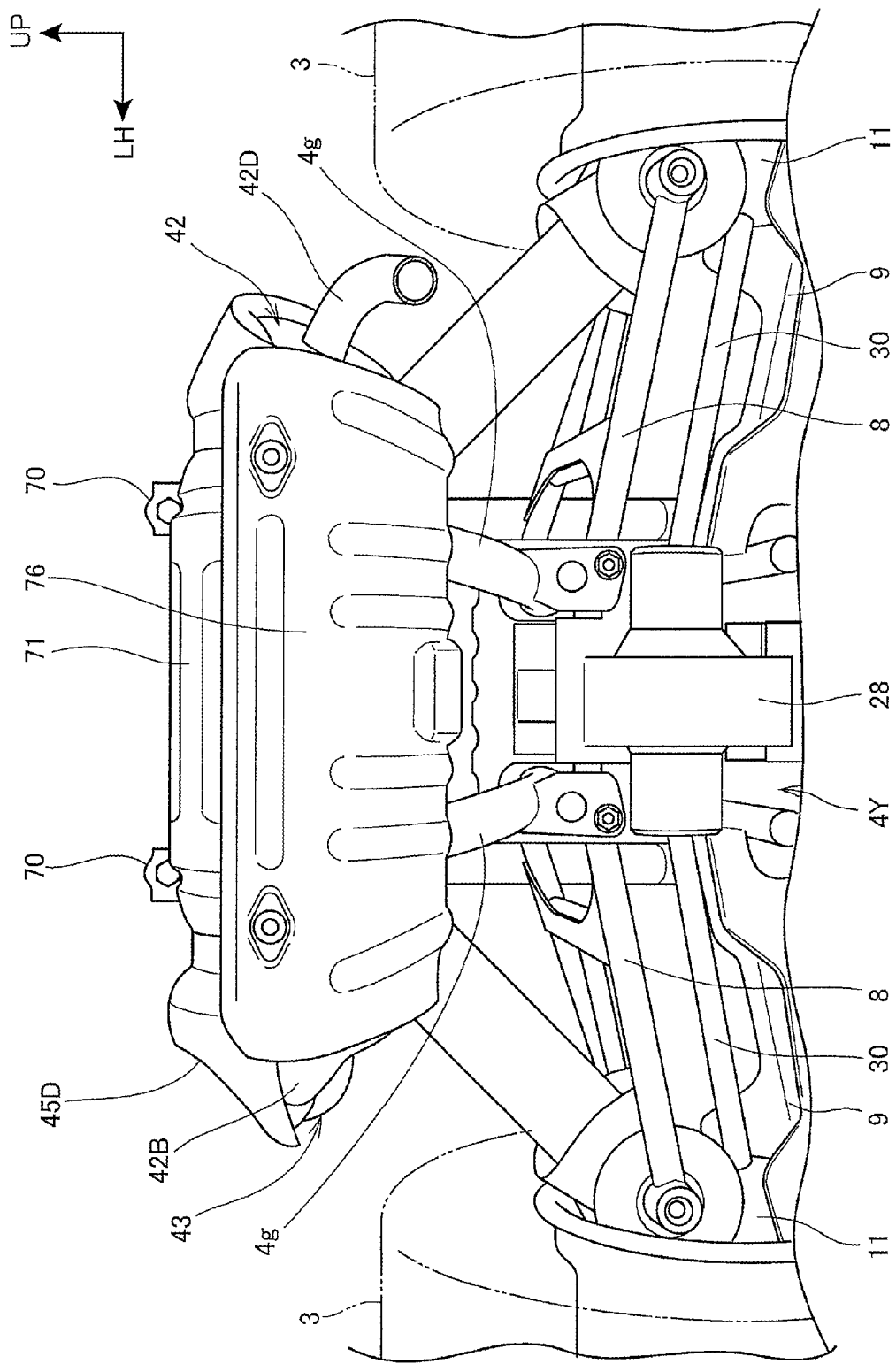
FIG. 13 is an elevation view with an inner cover viewed from a rear side of a vehicle body together with the peripheral construction.

With reference to FIGS. 11-13, a downstream end of the cylindrical body 42A is mounted with a bowl-shaped lid member 42C, and a tailpipe 42D is mounted to the lid member 42C.

As shown in FIG. 11, an internal space of the cylindrical body 42A is partitioned by a plurality of partition walls (in the present construction, three partition walls) (a first partition wall 61, a second partition wall 62, and a third partition wall 63 in order from the upstream side) at intervals in the axial direction (in the present construction, in the vehicle width direction) to form a plurality of expansion chambers 65, 66, 67. Also, the respective partition walls 61 to 63 are mounted with the communication pipes 68, 69 for allowing the expansion chambers 65 to 67 to communicate with each other.

More specifically, the expansion chamber 65 located between the first partition wall 61 and the second partition wall 62 composes the first expansion chamber for allowing the curved exhaust pipe 41G to communicate therewith. The first partition wall 61 is formed with an opening 61A (see FIG. 12) for allowing the first expansion chamber (expansion chamber 65) to communicate with the second expansion chamber as the space portion 60 sectioned between the first partition wall 61 and the catalytic converter 43.

Further, the first partition wall 61 is mounted with a second communication pipe 68. The second communication pipe 68 is passed through the second partition wall 62 across the first expansion chamber (expansion chamber 65), and is opened into the third expansion chamber (expansion chamber 66) located between the second partition wall 62 and the third partition wall 63.

As shown in FIG. 11, the third partition wall 63 is provided with a third communication pipe 69, and the third communication pipe 69 allows the third expansion chamber (expansion chamber 66) to communicate with the fourth expansion chamber (expansion chamber 67) located between the third partition wall 63 and the lid member 42C.

With this construction, the exhaust gas emitted from the exhaust pipe 41 (curved exhaust pipe 41G) is firstly led to flow into the first expansion chamber (expansion chamber 65). After that, the exhaust gas is led to flow into the second expansion chamber (space portion 60) while reversing a flow direction thereof, led to sequentially flow into the third expansion chamber (expansion chamber 66) and the fourth expansion chamber (expansion chamber 67), and discharged from the tailpipe 42D.

As shown in FIG. 11, since the cross-sectional area of the cylindrical body 42A is formed larger than the exhaust pipe 41 (including the catalytic converter 43), the exhaust gas is depressurized in the respective expansion chambers 65, 60, 66, and 67, and the sufficiently depressurized exhaust gas can be discharged.

Also, in the case of this construction, since the space portion 60 functioning as the expansion chamber (second expansion chamber) is provided also between the cylindrical body 42A of the exhaust muffler 42 and the catalytic converter 43, efficient depressurization can be achieved.

In this way, since the expansion chamber (space portion 60) is provided using the space between the exhaust muffler 42 and the catalytic converter 43, capacity of the exhaust muffler 42 can be reduced by that part, and the exhaust muffler 42 can be compactified.

As shown in FIG. 9, the exhaust muffler 42 is provided with a pair of right and left upwardly projecting brackets 70, and the exhaust muffler 42 is fixed to the rear end portions 4a1 of the upper frames 4a by the brackets 70. Thereby, with reference to FIG. 9 and FIG. 6, the exhaust muffler 42 is supported so as to stride from side to side between the rear end portions 4a1 of the pair of right and left upper frames 4a in the planar view.

As shown in FIG. 9, the exhaust muffler 42 is mounted with a metal exhaust protector 71 integrally formed with the fourth exhaust protector 45D. The exhaust protector 71 is formed to have a U-shaped cross section for covering the exhaust muffler 42 from above to shield release of heat from the exhaust muffler 42 to the upper side.

Also, in the present construction, as shown in FIG. 5, the exhaust muffler 42 is supported below the upper surfaces of the upper frames 4a in the side view and above the pair of right and left carrier stays 56a for supporting the rear carrier 56 on the vehicle body frame 4 (sub-frames 4g). Thereby, the vehicle body frame 4 including the upper frames 4a exists forward of the exhaust muffler 42, the rear carrier 39 exists above the exhaust muffler 42, carrier stays 39a exist behind and below the exhaust muffler 42, and the exhaust muffler 42 can be covered with the vehicle components.

The pair of right and left carrier stays 56a is mounted with a resin outer cover 75 (see FIG. 1 and FIG. 2) that extends along the periphery of the exhaust muffler 42 in order to cover the exhaust muffler 42 over the lower portion from behind.

Also, an inner side of the resin outer cover 75 is mounted with a metal inner cover 76 (see FIG. 1 and FIG. 2) that functions as the exhaust protector. Here, FIG. 13 is a view with the inner cover 76 viewed from the rear side of the vehicle body together with the peripheral construction.

As shown in FIG. 13, the inner cover 76 is formed as a large-size cover for covering from behind the exhaust muffler 42, the catalytic converter 43, and a connection portion (cylindrical cover 42B) between the exhaust muffler 42 and the catalytic converter 43. Also, the outer cover 75 is formed as a large-size cover for covering an area wider than an area that is covered with the inner cover 76.

Since the inner cover 76 covers the exhaust muffler 24 from behind, the radiation heat from the exhaust muffler 24 can be shielded. Also, since the exhaust muffler 24 is covered with a cover having a double structure composed of the inner cover 76 and the outer cover 75, the exhaust muffler 42 can be sufficiently guarded from the mud water or the like splashed by the rear wheels 3.

As has been described above, as shown in FIG. 1 to FIG. 3 or the like, the present construction includes the exhaust pipe 41 that extends rearward of the vehicle body from the engine 21, and the exhaust muffler 42 that is coupled to the rear end of the exhaust pipe 41, that is arranged between the pair of right and left rear wheels 3, and that extends in the horizontal direction of the vehicle body. In this construction, the catalytic converter (catalytic device) 43 is installed in the middle of the exhaust pipe 41, and also the exhaust pipe 41 is deviated to one side in the horizontal direction of the vehicle body with respect to the engine 21 and the exhaust muffler 42 in order to position the catalytic device 43 between the vehicle body frame 4 and the rear wheels 3. With this construction, the catalytic converter 43 can be efficiently arranged using the comparatively wide empty space between the vehicle body frame 4 and the rear wheels 3, and also the thermal effect caused by the radiation heat of the catalytic converter 43 can be suppressed.

Also, as shown in FIG. 9, the rear cushions 10 are provided between the rear wheels 3 and the vehicle body frame 4, and the catalytic converter 43 is arranged to pass through the empty space SA that is formed by the rear cushions 10 and the rear wheels 3 and that has the V-shape viewed from the back surface of the vehicle body. With this construction, the catalytic converter 43 can be arranged using the V-shaped space that is formed between the rear cushions 10 and the rear wheels 3 and that is enlarged upward, and the wide heat-insulated space can be ensured between the catalytic converter and the peripheral components.

Further, as shown in FIG. 2, the vehicle body frame 4 includes the pair of right and left upper frames 4a that extend in the longitudinal direction with respect to the upper portion of the vehicle body, and the exhaust muffler 42 is attached to the rear end portions 4a1 in order to stride from side to side between the rear end portions 4a1 of the upper frames 4a. With this construction, the exhaust muffler 42 can be held in the comparatively high position and in the position close to the catalytic converter 43. Thereby, connection with the catalytic converter 43 between the vehicle body frame 4 and the rear wheels 3 can be smoothened, and the heat-insulated space and the improvement of the engine performance by the improvement of the exhaust efficiency can be achieved.

Also, with reference to FIG. 5 and FIG. 6, the exhaust gas sensor 47 is arranged in the position facing the exhaust inlet of the catalytic device 43, the exhaust gas sensor 47 is arranged on the inner side of the exhaust pipe 41 in the planar view of the vehicle body, and the sensor cord 47a from the exhaust gas sensor 47 is arranged along the upper frame 4a. With this construction, the exhaust gas sensor 47 and the sensor cord 47a can be protected from the mud water or the like splashed by the rear wheels 3. Also, the assemblability such as the positioning of the sensor cord 47a can be improved.

Also, with reference to FIG. 10A and FIG. 6, the reduced-diameter cylindrical portion 43D composing the exhaust outlet of the catalytic converter 43 is offset inward in the planar view of the vehicle body with respect to the axis center (=the axis center LS) of the catalytic converter 43. With this construction, the exhaust flow on the offset side can be ensured, and the detection performance of the exhaust gas sensor 47 can be improved. Improvement of the detection performance can improve exhaust emission control performance.

Further, as shown in FIG. 5, the present construction includes the catalytic converter 43, the exhaust pipe 41 in front of and behind the catalytic converter 43, and the exhaust protectors 45A to 45D, and 71 that have the U-shaped cross section for covering the exhaust muffler 42 from above the vehicle body. With this construction, the radiation heat from the catalytic converter 43 to the upper side of the vehicle body is reduced to prevent the thermal effect on the vehicle body cover 51 or the like. Also, since the lower portions of the exhaust protectors 45A to 45D and 71 are configured to be opened, the internal space of each of the exhaust protectors 45A to 45D and 71 can be cooled by traveling wind, and the thermal effect can be further reduced.

Also, as shown in FIG. 10A and FIG. 10B, the catalytic converter 43 includes the outer cylinder 43A having the cylindrical portion 43C that has the same cross-sectional surface and the same diameter and that extends in the axis center direction, and the catalyst 44 that is held in order to bring the whole outer peripheral surface into contact with the inner peripheral surface of the cylindrical portion 43C having the same diameter. With this construction, in such a construction that the heat-insulated space around the catalytic converter 43 is ensured and the high-temperature toughness (the thermal effect on the outside can be allowed) can be improved, the temperature of the outer cylinder is raised to reduce the temperature difference between the outer cylinder 43A and the catalyst 44, and the difference in heat contraction can be reduced. Thereby, the catalyst 44 can be stably held in the outer cylinder 43A, and a reduction or the like in the service life of the catalyst 44 caused by the vibration or the like can be prevented.

As described above, the present invention has been described based on one embodiment. The present invention is not limited to this, and various design modifications may be made within the scope not departing from the gist of the present invention.

For example, in the above-mentioned embodiment, the present invention applied to the exhaust structure for the four-wheeled saddle-ride type vehicle classified into ATV has been described. Application of the present invention is not limited to the foregoing. The present invention may be applied to a three-wheeled saddle-ride type vehicle and a compact vehicle not classified into the ATV.

REFERENCE NUMBERS

1 . . . Saddle-ride type vehicle (compact vehicle)
2 . . . Front wheel
3 . . . Rear wheel
4 . . . Vehicle body frame
4a . . . Upper frame
4a1 . . . Rear end portion of upper frame
10 . . . Rear cushion
21 . . . Engine (internal combustion engine)
41 . . . Exhaust pipe
42 . . . Exhaust muffler
43 . . . Catalytic converter (catalytic device)
43A . . . Outer cylinder
43B . . . Enlarged-diameter cylindrical portion
43C . . . Cylindrical portion having same diameter
43D . . . Reduced-diameter cylindrical portion
44 . . . Catalyst
45A-45D, 71 . . . Exhaust protector
47 . . . Exhaust gas sensor
47a . . . Sensor cord
76 . . . Inner cover (exhaust protector)
SA . . . V-shaped space
LS . . . Axis center

What is claimed is:

1. An exhaust structure for a compact vehicle, the compact vehicle including a vehicle body frame that extends in a longitudinal direction to support a pair of right and left front wheels and a pair of right and left rear wheels, the vehicle body frame includes a pair of right and left upper and lower frames and a pair of right and left sub-frames extending rearward from rear end portions of the lower frames and coupled to rear end portions of the upper frames, a rear carrier supported on the right and left sub-frames by right and left carrier stays extending from the rear carrier and attached to the right and left sub-frames, and an engine that is located forward of the pair of rear wheels and that is supported on the vehicle body frame, the exhaust structure comprising:
an exhaust pipe that extends rearward of a vehicle body from the engine;
an exhaust muffler that is coupled to a rear end of the exhaust pipe, that is arranged between the pair of right and left rear wheels, and that extends laterally in a horizontal direction of the vehicle body; and
a catalytic device installed in a middle of the exhaust pipe, wherein the exhaust pipe is deviated laterally to one side in the horizontal direction of the vehicle body with respect to the engine and the exhaust muffler to position the catalytic device between the one of the right and left upper frames of the vehicle body frame and the corresponding one of the right and left rear wheels,
wherein the exhaust muffler is configured to be supported below the upper frames, supported above and rearward of the sub-frames, and supported above the carrier stays when viewed from a side of the vehicle body.

2. The exhaust structure for a compact vehicle according to claim 1,
wherein a rear cushion is arranged between the pair of rear wheels and the vehicle body frame, and
the catalytic device is arranged to pass through a space that is formed by the rear cushion and the pair of rear wheels and has a V-shape when viewed from a back surface of the vehicle body.

3. The exhaust structure for a compact vehicle according to claim 2,
wherein the exhaust muffler is attached to the rear end portions of the upper frames to extend from side to side between the rear end portions of the upper frames.

4. The exhaust structure for a compact vehicle according to claim 3,
wherein an exhaust gas sensor is arranged in a position facing an exhaust inlet of the catalytic device,
the exhaust gas sensor is arranged on an inner side of the exhaust pipe in a planar view of the vehicle body, and
a sensor cord from the exhaust gas sensor is arranged along the vehicle body frame.

5. The exhaust structure for a compact vehicle according to claim 4, wherein an exhaust outlet of the catalytic device is offset to an inner side in the planar view of the vehicle body with respect to an axis center of the catalytic device.

6. The exhaust structure for a compact vehicle according to claim 2, wherein an exhaust protector having a U-shaped cross section is provided to cover the catalytic device and the exhaust pipe in front of and behind the catalytic device from above the vehicle body.

7. The exhaust structure for a compact vehicle according to claim 3, wherein an exhaust protector having a U-shaped cross section is provided to cover the catalytic device and the exhaust pipe in front of and behind the catalytic device from above the vehicle body.

8. The exhaust structure for a compact vehicle according to claim 4, wherein an exhaust protector having a U-shaped cross section is provided to cover the catalytic device and the exhaust pipe in front of and behind the catalytic device from above the vehicle body.

9. The exhaust structure for a compact vehicle according to claim 5, wherein an exhaust protector having a U-shaped cross section is provided to cover the catalytic device and the exhaust pipe in front of and behind the catalytic device from above the vehicle body.

10. The exhaust structure for a compact vehicle according to claim 2, wherein the catalytic device has an outer cylinder having a cylindrical portion that has a same cross-sectional surface and a same diameter and that extends in an axis center direction, and a catalyst that is held to bring an entire outer peripheral surface into contact with an inner peripheral surface of the cylindrical portion having the same diameter.

11. The exhaust structure for a compact vehicle according to claim 3, wherein the catalytic device has an outer cylinder having a cylindrical portion that has a same cross-sectional surface and a same diameter and that extends in an axis center direction, and a catalyst that is held to bring an entire outer peripheral surface into contact with an inner peripheral surface of the cylindrical portion having the same diameter.

12. The exhaust structure for a compact vehicle according to claim 4, wherein the catalytic device has an outer cylinder having a cylindrical portion that has a same cross-sectional surface and a same diameter and that extends in an axis center direction, and a catalyst that is held to bring an entire outer peripheral surface into contact with an inner peripheral surface of the cylindrical portion having the same diameter.

13. The exhaust structure for a compact vehicle according to claim 5, wherein the catalytic device has an outer cylinder having a cylindrical portion that has a same cross-sectional surface and a same diameter and that extends in an axis center direction, and a catalyst that is held to bring an entire outer peripheral surface into contact with an inner peripheral surface of the cylindrical portion having the same diameter.

14. The exhaust structure for a compact vehicle according to claim 1, wherein an exhaust protector having a U-shaped cross section is provided to cover the catalytic device and the exhaust pipe in front of and behind the catalytic device from above the vehicle body.

15. The exhaust structure for a compact vehicle according to claim 14, wherein the catalytic device has an outer cylinder having a cylindrical portion that has a same cross-sectional surface and a same diameter and that extends in an axis center direction, and a catalyst that is held to bring an entire outer peripheral surface into contact with an inner peripheral surface of the cylindrical portion having the same diameter.

16. The exhaust structure for a compact vehicle according to claim 1, wherein the catalytic device has an outer cylinder having a cylindrical portion that has a same cross-sectional surface and a same diameter and that extends in an axis center direction, and a catalyst that is held to bring an entire outer peripheral surface into contact with an inner peripheral surface of the cylindrical portion having the same diameter.

17. The exhaust structure for a compact vehicle according to claim 1, wherein a longitudinal axis of the exhaust muffler is oriented perpendicular to a longitudinal axis defined by the vehicle body frame.

18. An exhaust structure for a compact vehicle, the compact vehicle including a vehicle body frame that extends in a longitudinal direction to support a pair of right and left front wheels and a pair of right and left rear wheels, and an engine that is located forward of the pair of rear wheels and that is supported on the vehicle body frame, the exhaust structure comprising:
an exhaust pipe that extends rearward of a vehicle body from the engine;
an exhaust muffler located rearward of the vehicle body frame when viewed from a side of the vehicle body frame that is coupled to a rear end of the exhaust pipe, that is arranged between the pair of right and left rear wheels, that extends laterally in a horizontal direction of the vehicle body;
a catalytic device installed in a middle of the exhaust pipe, wherein the exhaust pipe is deviated laterally to one side in the horizontal direction of the vehicle body with respect to the engine and the exhaust muffler to position the catalytic device between the vehicle body frame and the pair of rear wheels;
a first exhaust protector provided to cover the catalytic device and the exhaust pipe in front of and behind the catalytic device from above the vehicle body; and
a second exhaust protector provided below the exhaust muffler to cover a lower portion of the exhaust muffler from behind, the second exhaust protector defined by an outer cover mounted with a metal inner cover, the inner cover covering from behind the exhaust muffler, the catalytic device and a connection portion between the exhaust muffler and the catalytic device,
wherein a rear cushion is arranged between the pair of rear wheels and the vehicle body frame, and the catalytic device is arranged to pass through a space that is formed by the rear cushion and the pair of rear wheels and has a V-shape when viewed from a back surface of the vehicle body.

19. The exhaust structure for a compact vehicle according to claim 18, wherein a longitudinal axis of the exhaust muffler is oriented perpendicular to a longitudinal axis defined by the vehicle body frame.

20. The exhaust structure for a compact vehicle according to claim 18, wherein the vehicle body frame includes a pair of right and left upper frames that extend in the longitudinal direction with respect to an upper portion of the vehicle body, and the exhaust muffler includes brackets attached to rear end portions of the upper frames, the exhaust muffler extending from side to side between the rear end portions of the upper frames.

\* \* \* \* \*